(12) United States Patent
Glazier et al.

(10) Patent No.: US 10,958,974 B2
(45) Date of Patent: *Mar. 23, 2021

(54) METHODS AND SYSTEMS FOR CONTROLLING MEDIA DISPLAY IN A SMART MEDIA DISPLAY ENVIRONMENT

(71) Applicant: Google LLC, Mountain View, CA (US)

(72) Inventors: Adam Glazier, Oakland, CA (US); Tomer Shekel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,579

(22) Filed: Nov. 2, 2018

(65) Prior Publication Data

US 2019/0075358 A1 Mar. 7, 2019

Related U.S. Application Data

(63) Continuation of application No. 15/002,276, filed on Jan. 20, 2016, now Pat. No. 10,123,077.

(51) Int. Cl.
*H04N 21/41* (2011.01)
*H04N 21/45* (2011.01)
(Continued)

(52) U.S. Cl.
CPC ... *H04N 21/4524* (2013.01); *H04N 21/41407* (2013.01); *H04N 21/4333* (2013.01); *H04N 21/43615* (2013.01); *H04N 21/43637* (2013.01); *H04N 21/4432* (2013.01); *H04N 21/4436* (2013.01); *H04N 21/44218* (2013.01); *H04N 21/44227* (2013.01); *H04N 21/485* (2013.01)

(58) Field of Classification Search
None
See application file for complete search history.

(56) References Cited

U.S. PATENT DOCUMENTS 8,880,051 B2 11/2014 Ghosh et al.
9,106,720 B1 * 8/2015 Hunt .................. H04L 67/30
(Continued)

FOREIGN PATENT DOCUMENTS

CN 104616675 5/2015
WO WO 2014145140 9/2014

OTHER PUBLICATIONS

Examination Report dated Oct. 29, 2019 in EP Patent Application No. 17703865.0.
(Continued)

*Primary Examiner* — Cai Y Chen
(74) *Attorney, Agent, or Firm* — Byrne Poh LLP

(57) ABSTRACT

A method is implemented on a casting device to enable a follow-me mode in which the casting device controls display of media content on an output device coupled to the casting device. The casting device detects a client device associated with the casting device, and determines a proximity of the client device. In accordance with a determination that the client device is within a proximity threshold of the casting device, the casting device receives content information associated with content recently accessed by the client device, obtains the content from a content source in accordance with the content information, and outputs the obtained content to an output device in accordance with the content information.

19 Claims, 15 Drawing Sheets

(51) Int. Cl.
*H04N 21/433* (2011.01)
*H04N 21/442* (2011.01)
*H04N 21/414* (2011.01)
*H04N 21/436* (2011.01)
*H04N 21/4363* (2011.01)
*H04N 21/443* (2011.01)
*H04N 21/485* (2011.01)

(56) References Cited

U.S. PATENT DOCUMENTS

| | | |
|---|---|---|
| 9,414,105 B2 * | 8/2016 | Rajapakse ........ H04N 21/41407 |
| 9,769,512 B2 * | 9/2017 | Yu .................... H04N 21/44222 |
| 2004/0128065 A1 | 7/2004 | Taylor et al. |
| 2005/0097595 A1 | 5/2005 | Lipsanen et al. |
| 2005/0246738 A1 | 11/2005 | Lockett et al. |
| 2008/0141302 A1 | 6/2008 | Ota |
| 2008/0256590 A1 | 10/2008 | Oosterholt |
| 2009/0052859 A1 | 2/2009 | Greenberger et al. |
| 2009/0265729 A1 | 10/2009 | Weinblatt |
| 2012/0284757 A1 | 11/2012 | Rajapakse |
| 2013/0165164 A1 | 6/2013 | Rowe |
| 2013/0332565 A1 | 12/2013 | Wang |
| 2014/0141714 A1 * | 5/2014 | Ghosh .................. H04W 8/005 455/39 |
| 2014/0274185 A1 | 9/2014 | Luna et al. |
| 2014/0280865 A1 | 9/2014 | Albertson et al. |
| 2015/0128194 A1 | 5/2015 | Kuang et al. |
| 2015/0215382 A1 | 7/2015 | Arora et al. |
| 2015/0256954 A1 | 9/2015 | Carlsson et al. |
| 2015/0314454 A1 | 11/2015 | Breazeal et al. |
| 2015/0331666 A1 | 11/2015 | Bucsa et al. |

OTHER PUBLICATIONS

International Search Report and Written Opinion dated Mar. 28, 2017 in International Patent Application No. PCT/US2017/014292.
Notice of Allowance dated Jun. 26, 2018 in U.S. Appl. No. 15/002,276.
Office Action dated Jan. 9, 2017 in U.S. Appl. No. 15/002,276.
Office Action dated Mar. 9, 2018 in U.S. Appl. No. 15/002,276.
Office Action dated Apr. 13, 2017 in U.S. Appl. No. 15/002,276.
Office Action dated Sep. 5, 2017 in U.S. Appl. No. 15/002,276.
Office Action dated Jul. 1, 2020 in CN Patent Application No. 201780003582.0.
Summons to Attend Oral Proceedings dated Sep. 11, 2020 in EP Patent Application No. 17703865.0.

* cited by examiner

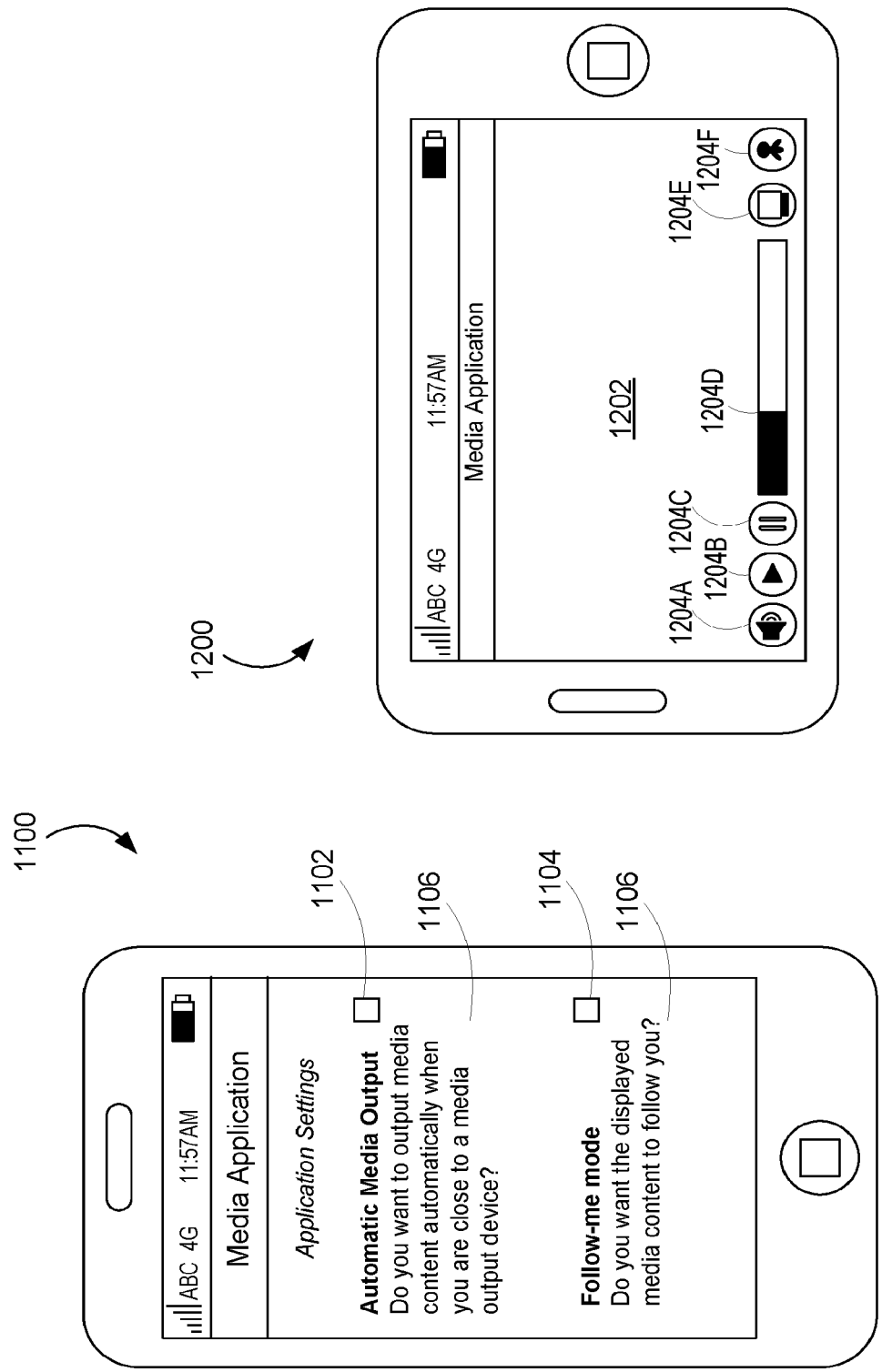

At a casting device having one or more processors and memory storing instructions for execution by the one or more processors, wherein the casting device is coupled to an output device: ⟵ 1400

After determining that the output device operates at an inactive state: — 1402

When the output device operates at the inactive state, the casting devices implements one of a group of operations consisting of:
  powering off the output device;
  ceasing outputting media content to the output device,
  causing the output device to pause display of media content that is received by the output device,
  ceasing obtaining media content from any content source,
  causing the output device to reduce an output volume while continuing display of media content received by the output device, and
  muting a speaker of the output device
— 1414

Detecting a client device associated with the casting device — 1404

Determining a proximity of the client device, including determining whether the client device is within a proximity threshold from the casting device — 1406

Obtaining from one of a smart home device and the client device information concerning the proximity between the smart home device and the client device — 1416

Providing location information of the casting device to a server associated with the one or more content sources — 1418

Obtaining from the server information of the proximity of the client device — 1420

METHODS AND SYSTEMS FOR CONTROLLING MEDIA DISPLAY IN A SMART MEDIA DISPLAY ENVIRONMENT

CROSS-REFERENCE TO RELATED APPLICATION

This application is a continuation of U.S. patent application Ser. No. 15/002,276, filed Jan. 20, 2016, which is hereby incorporated by reference herein in its entirety.

TECHNICAL FIELD

This application relates generally to computer technology, including but not limited to methods and systems for controlling display of media content on one or more output display devices within a smart media display environment based on user proximity and/or location detected with respect to one or more casting devices.

BACKGROUND

Media display devices have been widely applied to display media content to audience who gather around the media display devices. As far as they do not interfere with each other, multiple media display devices can be distributed at different locations of a media display environment (e.g., a family household or an office building) to display media content individually or simultaneously. Many existing media display devices are paired with casting devices (e.g., an Apple TV box and a Google TV box) or act as smart television devices to receive television broadcast, satellite broadcast or Internet-based media content. However, these existing media display devices have to be powered on and off individually when a user presses a power button that is located either on a media display device or on a remote control device that is communicatively coupled to its associated media display device.

Under some circumstances, when a user is moving around in a media display environment including multiple media display devices (e.g., from a living room to a bedroom in a family household), he or she has to power off a display device, remember a content source that provides the content displayed thereon, power on another display device, and tune this other display device to continue the display of media content that has been terminated on the previously viewed display device. This could be inconvenient for many users who desire to continue to watch the same media content while moving around in a media environment.

SUMMARY

Accordingly, there is a need for smart media display control, and specifically, a need to create a smart media display environment where display of media content is controlled automatically without user intervention. In various implementations of this application, a smart media display environment includes multiple media display devices each disposed at a distinct location. Each media display device is coupled to a casting device (e.g., a set top box) that is configured to detect a user's proximity to the casting device. The casting device applies detected information of the user proximity to switch the media player device between an active mode and an inactive mode. Furthermore, the casting devices of the smart media environment determine a user location within the smart media display environment based on the user proximity information collected at individual casting devices. The casting devices then use the proximity information to support a follow-me mode in which media content that has been watched by a user follows a user to the user location and continues to be displayed at a media display device located at the detected user location. Such methods optionally complement or replace conventional methods of requiring an audience to use a remote control or a client device to control the display of the media content and enabling automatic control of the media display devices without user intervention.

In accordance with one aspect of this application, a method is implemented on a casting device having one or more processors and memory storing one or more programs for execution by the one or more processors. The casting device is coupled to an output device, and the method is implemented to control display of media content on the output device after it is determines that the output device operates at an inactive state. The method includes detecting a client device associated with the casting device, and determining a proximity of the client device, including determining whether the client device is within a proximity threshold from the casting device. The method further includes in accordance with a determination that the client device is within the proximity threshold from the casting device, controlling the output device to change from the inactive state to an active state, and receiving media content from one or more content sources for display on the output device.

In accordance with another aspect of this application, an electronic device is configured to control display of media content on an output device that is coupled to the electronic device. The electronic device includes one or more processors, and memory storing one or more programs to be executed by the one or more processors. The one or more programs further include instructions for implementing the operations of the above method for controlling the display of the media content.

Further, in accordance with one aspect of this application, a method is implemented on a casting device having one or more processors and memory storing one or more programs for execution by the one or more processors. The casting device is coupled to an output device, and the method is implemented to enable a follow-me mode in which the casting device controls display of media content on the output device. The method includes detecting a client device associated with the casting device, and determining a proximity of the client device. The method further includes in accordance with a determination that the client device is within a proximity threshold of the casting device, receiving content information associated with content recently accessed by the client device, obtaining the content from a content source in accordance with the content information, and outputting the obtained content to an output device in accordance with the content information.

In accordance with another aspect of this application, an electronic device is configured to control display of media content on an output device that is coupled to the electronic device according to a follow-me mode. The electronic device includes one or more processors, and memory storing one or more programs to be executed by the one or more processors. The one or more programs further include instructions for implementing the operations of the above method for controlling the display of the media content according to the follow-me mode.

In accordance with some implementations, a casting device includes means for performing the operations of any of the methods described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 11 is another example user interface displayed on a display of a client device for controlling a schedule for an automatic media output mode and a follow-me mode of a media application in accordance with some implementations.

FIG. 12 is an example user interface that displays media content on a display of a client device in accordance with some implementations.

FIGS. 14A and 14B are flow diagrams illustrating a method of controlling display of media content for automatic media output based on user proximity or location in accordance with some implementations.

Like reference numerals refer to corresponding parts throughout the several views of the drawings.

DETAILED DESCRIPTION

Figure 1:
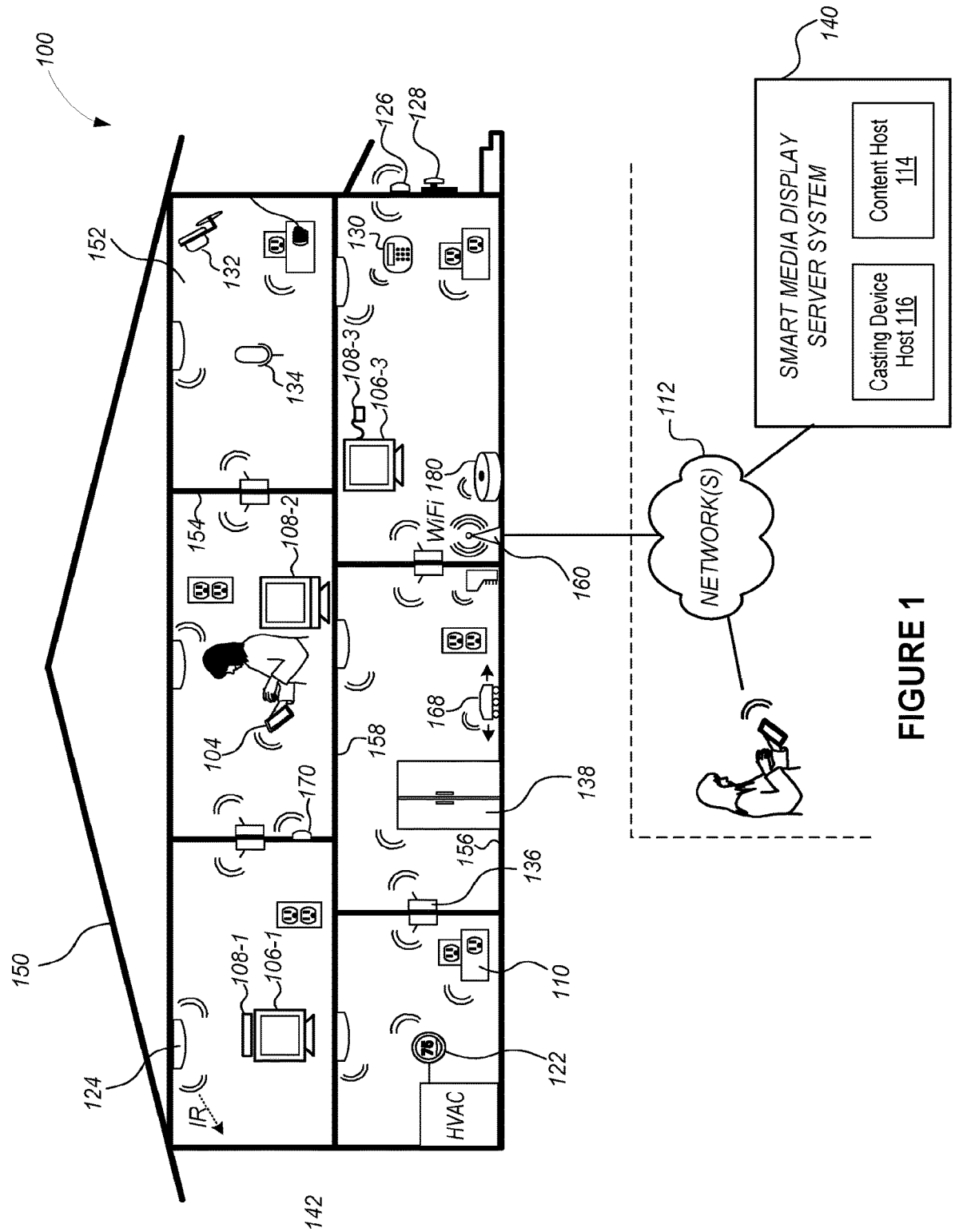
FIG. 1 is an example smart media display environment in accordance with some implementations.

In various implementations of the application, a smart media display environment includes at least one output device that is coupled to a casting device and configured to display media content streamed by the casting device. The smart display environment is created to control the at least one output device and the display of the media content automatically and with no or little user intervention. The casting device detects a user's proximity to the casting device, or the user's location within the smart media display environment. In some implementations, the casting device applies detected information of the user proximity to switch the media player device between an active mode and an inactive mode. For example, the casting device located at a specific location determines that the user is in proximity, and powers on an output device that is coupled to the casting device. It is noted that such automatic control of media display does not need user intervention to power on or control the output device when a user approaches the casting device.

Further, in some implementations, the casting device uses user proximity information to support a follow-me mode in which display of media content that has been watched by a user follows a user to a new user location and continues to be displayed at an output device located at the new user location. Specifically, in an example, a user is moving around in the smart media display environment including multiple output devices for displaying media content (e.g., from a living room to a bedroom in a family household). When the user leaves the living room, she does not need to power off an output device she has watched or remember a content source that provides the content displayed thereon. Rather, the output device could be automatically turned off or muted according to predetermined media control settings. When the user enters the bedroom, another output device located there will be powered on automatically and tuned to continue the display of the media content from where it has been terminated on the previously watched output device. Thus, such methods complement or replace conventional methods of requiring an audience to use a remote control or a client device to control the display of the media content, and enables control of the media display devices automatically and with no or little user intervention.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart media display environment 100 in accordance with some implementations. The smart media display environment 100 includes a structure 150 (e.g., a house, office building, garage, or mobile home) with various integrated devices. It will be appreciated that devices may also be integrated into a smart media display environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media device is disposed in the smart media display environment 100 to provide media content that is stored at a local content source or streamed from a remote content source. The media devices can be classified to two categories: output devices 106 that directly output the media content to audience, and casting devices 108 that streams media content to the output devices 108. Examples of the output devices 106 include, but are not limited to television (TV) display devices and music players. Examples of the casting devices 108 include, but are not limited to, a set-top boxes (STBs), DVD players and TV boxes. In the example smart media display environment 100, the output devices 106 are disposed in more than one location, and each output device 106 is coupled to a respective casting device 108 or includes an embedded casting unit. The output device 106-1 includes a TV display that is hard wired to a DVD player or a set top box 108-1. The output device 106-2 includes a smart TV device that integrates an embedded casting unit to stream media content for display to its audience. The output device 106-3 includes a regular TV display that is coupled to a TV box 108-3 (e.g., Google TV or Apple TV products), and such a TV box 108-3 streams media content received from a media content and provides an access to the Internet for displaying Internet-based content on the output device 106-3.

In some implementations, an automatic media output mode is implemented at the casting devices 108 located in the smart media display environment 100. In accordance with the automatic media output mode, an output device 106 automatically switches to an active state based on a proximity of a client device. Specifically, after a casting device 108 determines that an output device 106 coupled thereto operates at an inactive state, the casting device 108 detects a client device 104 associated with the casting device 108, and determines that a proximity of the client device 104. The casting device 108 determines whether the client device 104 is within a proximity threshold from the casting device 108. In accordance with a determination that the client device 104 is within the proximity threshold from the casting device 108, the casting device 108 controls the output device to change from the inactive state to an active state, and receives media content from one or more content sources for display on the output device. It is noted that when the output device 106 operates at the inactive state, the casting device 108 could power off the output device 106, cease outputting media content to the output device 106, cause the output device 106 to pause display of media content received from the casting device 108 and displayed thereon, cease obtaining media content from any content source, cause the output device 106 to reduce an output volume associated with media content displayed thereon, or mute the output device 106.

In some implementations, a follow-me mode is implemented at casting devices 108 located in the smart media display environment 100. In accordance with the follow-me mode, display of media content generally follows a user when the user moves among different locations in the smart media display environment 100. Stated another way, when the user reaches a specific location, an output device located at the specific location is powered on and tuned to display the media content that was previously watched at a different location, allowing the user to continue to watch the media content with no or little interruption. Specifically, a first casting device 108 is located at a first location of the smart media display environment 100, and coupled to a display input of a first output device 106 at the first location. The first casting device 108 detects a client device 104 associated with the first casting device 106. The first casting device 108 determines a proximity of the client device 104. In accordance with a determination that the client device 104 is within a proximity threshold of the first casting device 108, the casting device 108 receives content information associated with content recently accessed by the client device 104, obtains the content from a content source in accordance with the content information, and outputs the obtained content to the first output device 106 in accordance with the content information.

Further, in some implementations, while outputting the obtained content, the first casting device 106 determines that the client device 104 is outside the proximity threshold from the first casting device 106. The first client device 106 then implements at least one operation of powering off the output device 106, ceasing outputting the obtained content on the output device 108, causing the output display 108 to pause the display of the content displayed thereon, ceasing obtaining the content from the content source in accordance with the content information, causing the output device 108 to reduce an output volume associated with the obtained content, and muting the output device. As such, in the follow-me mode, when a user moves from a first location to a second location in the smart media display environment, a casting device 108 located at the first location optionally implements one of the aforementioned operations, while another casting device 108 located at the second location detects a proximity of the user and causes its own output device 106 to display media content that has been displayed to the user at the first location.

In some implementations, smart home devices may be mounted on, integrated with and/or supported by a wall 154, floor 156 or ceiling 158 of the smart media display environment 100. The integrated devices include intelligent, multi-sensing, network-connected devices that integrate seamlessly with each other in a smart home network and/or with a central server or a cloud-computing system to provide a variety of useful smart home functions. In various implementations of the application, a smart home device is disposed at the same location of the smart home environment 100 as a casting device 108 and/or an output device 106, and therefore, is located in proximity to or with a known distance with respect to the casting device 108 and the output device 106. In some implementations, the smart home device identifies a location or a proximity of a client device 104, and directly provides to the casting device information related to the location or the proximity of the client device 104. Alternatively, in some implementations, the smart home device provides to the casting device 108 the information related to the location or the proximity of the client device 104 indirectly via a smart media display server system 140.

It is also noted that in some implementations, a smart home device identifies a location or a proximity of a user in person, and provides the information related to the location or the proximity of the user either directly to the casting device 108 or indirectly to the casting device 108 via the smart media display server system 140.

The smart home devices in the smart media display environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, one or more intelligent, multi-sensing, network-connected microphone devices 134, and one or more intelligent, multi-sensing, network-connected wall switches 136. In some implementations, the smart home devices in the smart media display environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. Optionally, the smart home devices have a capability of detecting a proximity of a client device or a user.

In some implementations, the smart home devices are configured to detect a presence, proximity and/or location of a user or a client device 104 carried by a user. For example, the smart doorbell 126 and/or the smart door lock 128 may detect a person's approach to or departure from a location (e.g., a living room). The smart alarm system 130 may detect the presence of an individual within close proximity, e.g., using built-in infrared (IR) sensors. The smart wall plugs 110 may detect occupancy of a room or enclosure. The camera 132 may capture an image or a video clip at a specific location, and the image or the video clip may be processed to identify the presence of a user in the specific location (e.g., a kitchen). Moreover, in some situations, specific individuals may be identified based, for example, on their appearance (e.g., height, face) and/or movement (e.g., their walk/gait) in an image or a video clip. Alternatively, cameras 132 may additionally include one or more embedded sensors (e.g., IR sensors and motion detectors) to detect a presence, proximity or location of a user. In addition, a microphone device 124 can be regarded as a smart home device in this application, and used to determine occupancy of a location in a smart media display environment. Specifically, audio captured by the microphone device 124 may be processed to identify the presence of an occupant in a particular room. Specific individuals may be identified based, for example, on characteristic of their voices.

The smart home devices in the smart media display environment 100 may additionally or alternatively include one or more other occupancy sensors (e.g., touch screens, IR sensors, ambient light sensors and motion detectors). In some implementations, the smart home devices in the smart media display environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 134, 136 and 138 (which are collectively referred to as "the smart home devices" or "the smart home devices 120") are capable of data communications and information sharing with other smart home devices, a central server or cloud-computing system, and/or other devices (e.g., the client device 104 and the casting devices 108) that are network-connected. Similarly, the casting devices 108 are capable of data communications and information sharing with the smart home devices, a central server or cloud-computing system, and/or other devices (e.g., the client device 104 and the other casting devices 108) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the casting devices 108 and the smart home devices serve as wireless or wired repeaters. In some implementations, a first one of and the casting devices 108 communicates with a second one of the casting devices 108 and the smart home devices via a wireless router. The casting devices 108 and the smart home devices may further communicate with each other via a connection (e.g., network interface 160) to a network, such as the Internet 112. Through the Internet 112, the casting devices 108 and the smart home devices may communicate with a smart media display server system 140 (also called a central server system and/or a cloud-computing system herein). Optionally, the smart media display server system 140 may be associated with a manufacturer, support entity, or service provider associated with the casting devices 108 and the media content displayed to the user. Accordingly, the smart media display server system 140 may include one or more content hosts 104 that provide the displayed media content, and a casting device host 116 associated with the casting devices 108.

In some implementations, the network interface 160 includes a conventional network device (e.g., a router). The smart media display environment 100 of FIG. 1 further includes a hub device 180 that is communicatively coupled to the network(s) 112 directly or via the network interface 160. The hub device 180 is further communicatively coupled to one or more of the above intelligent, multi-sensing, network-connected devices (e.g., smart home devices of the smart media display environment 100, the casting devices 108 and the client device 104). Each of these network-connected devices optionally communicates with the hub device 180 using one or more radio communication networks available at least in the smart media display environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2:
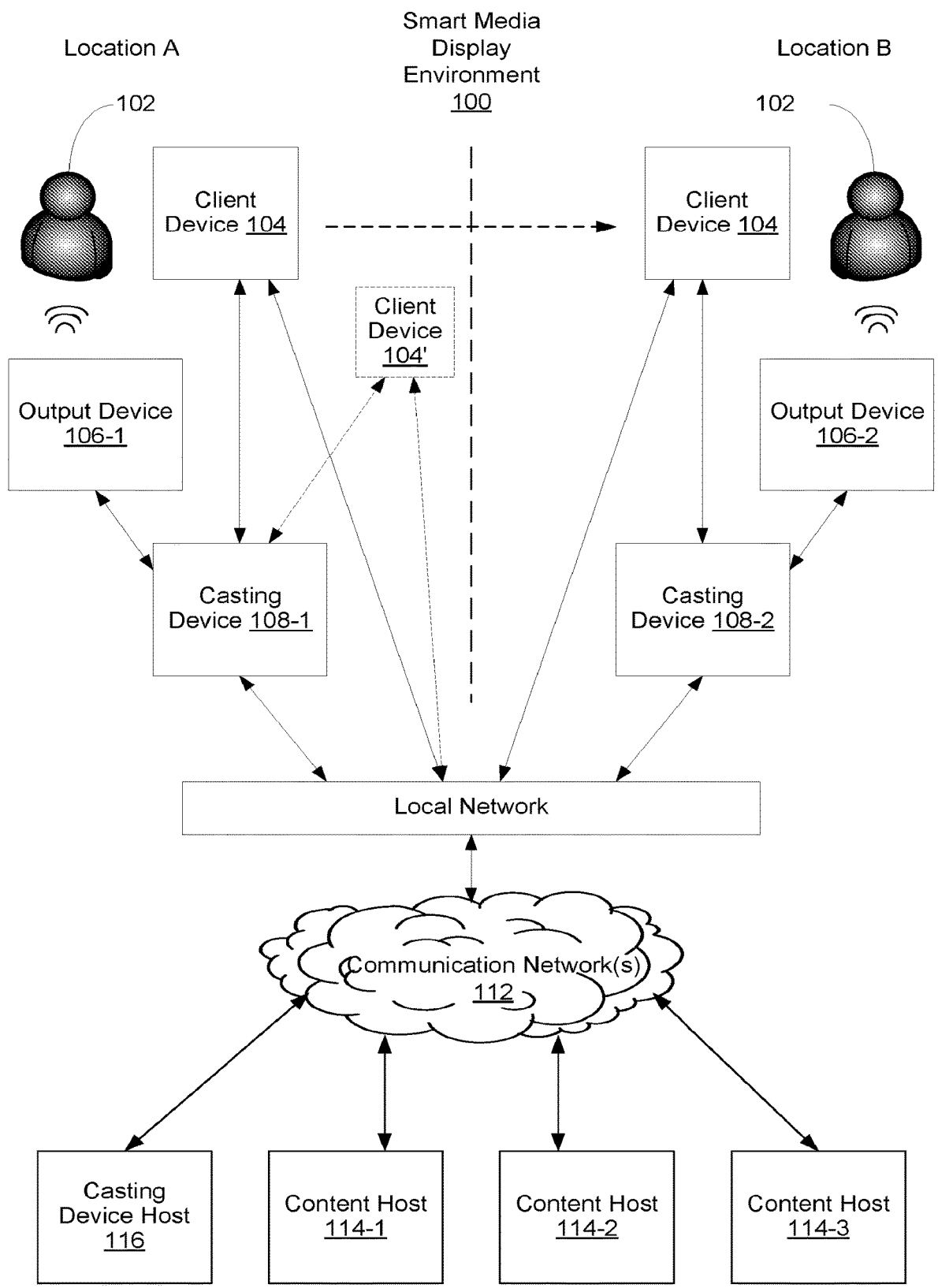
FIG. 2 is an example operating environment in which casting devices interact with a client device or a server system of the smart media display environment in accordance with some implementations.

FIG. 2 is an example operating environment in which casting devices 108 interact with a client device 104 or a server system 140 of a smart media display environment 100 in accordance with some implementations. The smart media display environment 100 includes one or more locations, location A and location B. The user 102 is located at location A or B, and could move freely between these two locations. A casting device 108 and an output device 106 are disposed at each of the one or more locations in the display environment 100, and communicated to each other via wired or wireless communication available therein. At each location, the respective casting device 108 is configured to obtain media content or Internet content for display on the output device 106 coupled to the casting device 108. In various embodiments of this application, the casting devices 108 are configured to detect a proximity of the user 102 or a client device 104 carried by the user 102, and control display of the media content displayed on the output devices according to the detected proximity of the user 102 or the client device 104.

In some implementations, the user 102 is located at a location (e.g., location A) within the smart media display environment 100, and the output device 106-1 operates at an inactive state. At such an inactive state, the output device 106-1 is optionally powered off, ceases receiving media content from the casting device 108-1, pauses display of any received media content, and/or reduces the volume of its speaker while continuing display of media content. On the other hand, the casting device 108-1 optionally powers off the output device 106-1, ceases outputting media content to the output device 106-1, causes the output device 106-1 to pause the display of any received media content, ceases obtaining media content from any content source, causes the output device 106-1 to reduce an output volume while continuing display of media content, and mutes the speaker of the output device 106-1. Alternatively, in some implementations, when the output device 106-1 is a computer-based display device, the inactive mode is one of a power-off mode, a sleep mode and a hibernate mode.

When the output device 106-1 operates at the inactive device, the casting device 108-1 detects a client device 104 associated with the casting device 108-1. In some implementations, the client device 104 is detected, when the casting device 108-1 identifies existence or identity of the client device 104. The casting device 108-1 determines a proximity of the client device 104 including whether the client device 104 is within a proximity threshold from the casting device 108-1 (e.g., within a range of 5 yards). When it is determined that the client device 104 is within the proximity threshold from the casting device 108-1, the casting device 108-1 controls the output device 106-1 to change from the inactive state to an active state, and receives media content from one or more content sources for display on the output device 106-1. At the active mode, the output device 106-1 may be awake, fully powered on and ready for use. In contrast, in some implementations, when it is determined that the client device 104 is outside the proximity threshold from the casting device 108-1, the casting device 108-1 maintains the inactive state at the output device 106-1.

In some implementations, when it enables the change of the output device 106-1 from the inactive state to the active state, the casting device 104 transmits a prompt to the client device 104. The prompt informs the user 102 of the change to the active state at the output device 106-1, and provides the user 102 with an option to cancel the change to the active state. In some implementations, after it enables the change of the output device 106-1 from the inactive state to the active state, the casting device 104 sends a notification to the client device 104 via the communication networks 112. The notification informs the user 102 of the change to the active state at the output device 106-1, while not providing the user 102 with an option to cancel the change to the active state. More details of the prompt and the notification displayed on the client device 104 are discussed below with reference to FIGS. 13A and 13B.

In some implementations, when the output device operates at the active state, the casting device 108-1 determines that the client device 104 is not within the proximity threshold from the casting device 108-1, and accordingly, controls the output device 106-1 to change from the active state to the inactive state. However, in some implementations, the casting device 108-1 maintains the status quo of the output device 106-1, and does not control the output device 106-1 to change from the active state to the inactive state, when the output device operates at the active state and the casting device 108-1 determines that the client device 104 is not within the proximity threshold from the casting device 108-1 any longer.

In some implementations, the casting device 108-1 detects the client device 104 and/or determines the proximity of the client device 104 according to a predefined schedule. Proximity determination could be prohibited at one or more predetermined schedules, e.g., when the use is not at home or when the user is asleep at night. More details on how to set forth the schedule for device detection and proximity determination are discussed below with reference to FIG. 9.

The casting device 108-1 could determine the proximity of the client device 104 based on its own detection of the presence of the client device 104. The casting device 108-1 could also determine the proximity of the client device 104 by receiving proximity information from the client device 104 that has detected the proximity of the casting device 108-1. Further, in some implementations, the casting device 108-1 provides its own location information to a server 140. The server 140 is configured to obtain location information of the client device 104 and determine the information of the proximity of the client device based on the location information of both the casting device 108-1 and the client device 104. The casting device 108-1 then obtains from the server 140 information of the proximity of the client device 104. Optionally, the server 140 is a casting device host 116 that has authenticated the client device 104. Optionally, the server 140 is a specific content host 114 that provides the media content for display on the output device 106-1 and recognizes both the casting device 108-1 and the client device 104.

Under some circumstances, an active state is enabled for the output device 106-1 when the user is available. The casting device 108-1 determines availability of the user 102 in addition to the proximity of the user 102 or the client device 104 of the user 102, before the casting device 108-1 controls the output device 106-1 to change from the inactive state to the active state. In some implementations, the casting device 108-1 monitors behavior of the user 102 within a predetermined period of time, and determines the availability of the user 102 according to the monitored behavior. In some implementations, the casting device 108-1 detects that the user 102 is engaged in a telephone conversation, and that the user 102 is present but not available. In accordance with a determination that the user 102 is not available, the casting device 108-1 deactivates the active state, maintains the inactive state and forgoes a change from the inactive state to the active state. Alternatively, in some implementations, the casting device 108-1 identifies the state of the client device, and determines whether to activate the output device according to the state of the client device. For example, the casting device 108-1 identifies that the client device is at a mute mode. Then, the casting device 108-1 determines that the user is present but not available, and maintains the inactive state at the output device 106-1.

In some situations, there is another client device 104' associated with another user is located at the same location (e.g., location A) where the user 102 is currently located. The casting device 108-2 determines whether it is associated with any other client device (e.g., the client device 104'). When it is determined that the other client device 104' is also within the proximity threshold from the casting device 108-1, the casting device 108-1 further determines that the client device 104 has a priority over the other client device 104', before it controls the output device 106-1 to change from the inactive state to the active state and receives media content from the one or more content sources for display on the output device 106-1.

In accordance with some implementations of this application, the casting devices 108 implement a follow-me mode that allows display of media content to follow the user 102 when the user 102 moves in the smart media display environment 100 (e.g., moves from location A to location B or from location B to location A). For example, the user 102 initially watches "Hoosiers" on the output device 106-2 at a living room (location B). When the user 102 leaves the living room and enters his bedroom (location A), the output device 106-1 is automatically powered on, and tuned to continue to play "Hoosiers" from a scene that was last viewed on the output device 106-2 located at the living room. The output device 106-2 could be powered off, paused or muted.

At the follow-me mode, the casting device 108-1 detects the client device 104 associated with the casting device 108-1. In some implementations, the client device 104 is detected when the casting device 108-1 identifies existence or identity of the client device 104. The casting device 108-1 determines a proximity of the client device 104. When it is determined that the client device is within a proximity threshold of the casting device 108-1 (e.g., within a range of 5 yards), the casting device 108-1 receives content information associated with content recently accessed by the client device 104, and obtains the content from a content source in accordance with the content information. Then, the casting device 108-1 outputs the obtained content to an output device in accordance with the content information. In an example, the content information includes information of a scene that was last viewed in another location (location B) distinct from location A. The content information is provided to the casting device 108-1 at location A, such that the casting device 108-1 could cause the output device 106-1 to play "Hoosiers" at location A from the scene that was last viewed at location B.

It is noted that the content information is not limited to an output position of the media content that is last accessed or viewed at a distinct location. In some implementations, the content information includes one or more of output position, output quality, output volume and an identifier of the content source. The obtained content is outputted to the output device 106-1 from the media content source in accordance with one or more of the output position, the output quality and the output volume.

When the user 102 leaves location A, the casting device 108-1 determines that the client device 104 is outside the proximity threshold the casting device 108-1. The casting device 108-1 could update the content information (e.g., output position, output quality, output volume and content source information) to the server 140. In some implementations, the client device 104 creates at least a token indicating where the content has been stopped at the time of the determination, and updates the content information with the token. Likewise, the content information originally provided to the casting device 108-1 was previously reported by a casting device located at the other location distinct form location A when the user 102 leaves the other location for location A.

Assume that the user 102 moves from location A to location B. At the location (e.g., location B) to which the user 102 is moved, the casting device 108-2 determines that the client device 104 is within a proximity threshold from the casting device 108-2 and that the casting device 108-2 is not associated with any other user or client device in the meantime. The casting device 108-2 receives the content information that has been updated at a previous location (e.g., location A) by the casting device 108-1 or the client device 104. The casting device 108-2 then obtains the content from the content source in accordance with the content information, and outputs the obtained content to the output device 106-1 in accordance with the content information.

In some implementations, the casting devices 108-1 and 108-2 are associated with a user account of an application (e.g., a casting device application), and the content information is stored in a memory of a remote server 140 associated with the user account of the application. The casting device 108-2 obtains the content information from the remote server 140, after the casting device 108-1 updates the content information stored at the remote server 140. Alternatively, the content information is stored in a local memory of the client device 104, and the casting device 108-2 receives the content information from the client device 104.

The client device 104 executes an application for controlling the display of the media content on the output devices 106. Examples of the application include a client device application, a casting device application, a media player application, a TV program application, and a satellite broadcast application. The client device application controls operations of the client device 104. The casting device application controls operations of the casting devices 108. The media player application enables display of media content provided by different content sources (e.g., Netflix, Youtube and Hulu). In some implementations, the application executed by the client device 104 displays a user interface including an affordance, and the affordance prompts a user to enter a user input to active the follow-me mode. The displayed affordance could be a toggle button. Alternatively, the application could also display another affordance on the user interface, and the affordance prompts a user input to activate an automatic media output mode in which the output devices 106 automatically changes from an inactive state to an active state upon detection of a proximity of a client device 104. More details on user interfaces for enabling the automatic media output mode and the follow-me mode are discussed below with reference to FIGS. 8A, 8B, 9, 10A, 10B, 11 and 12.

In some situations, there is another client device 104' associated with another user and located at the same location as the client device 104. The casting device 108-1 determines whether it is associated with any other client device (e.g., the client device 104'). When it is determined that another client device 104' is also within the proximity threshold from the casting device 108-1, the casting device 108-1 further determines that the client device 104 has a priority over the other client device 104', before it obtains the content from a content source in accordance with the content information and outputs the obtained content to the output device 106-1 in accordance with the content information. Stated another way, the follow-me mode is deactivated if the client device 104 does not have a priority over another client device 104' that exists at the same location and has been associated with the casting device 108-1.

Both the automatic media output mode and the follow-mode mode require a casting device 108 to determine a proximity of a client device 104 to the casting device 108.

In some implementations, the proximity of the client device 104 is determined at the casting device 108 at least by receiving an audio signal created by a user 102 of the client device 104 and determining the proximity of the client device 104 according to the audio signal. Optionally, the audio signal is triggered by the user 102 of the client device inadvertently when the user 102 enters the location and creates some noise. Optionally, the audio signal is associated with a predetermined voice command, e.g., "Turn on TV," that has to be spelled out by the user 102 to cause the determination of the proximity of the client device 104.

In some implementations, the casting device 104 further includes an optical sensor (e.g., an IR sensor). The proximity of the client device 104 is determined at the casting device 108 at least by receiving an optical signal associated with the user of the client device and determining the proximity of the client device according to the optical signal.

In some implementations, the proximity of the client device 104 is determined at the casting device 108 based on a Bluetooth (BT) signal emitted by the client device 104. For example, the casting device 108 measures the strength of the BT signal, and determines the proximity of the client device 104 based on the strength of the BT signal. In some implementations, the proximity of the client device 104 is determined at the casting device 108 via one or more WiFi signals communicated between the client device 104 and the casting device 108 over a local area network. In some implementations, the proximity of the client device 104 is determined at the casting device 108 based on a global positioning system (GPS) signal associated with the client device. For example, the user of the client device is approaching a household when the casting device determines the proximity of the client device based on the GPS signal. In some implementations, the proximity of the client device 104 is determined at the casting device 108 via two or more of a BT network, a WIFI network and a GPS according to a predetermined operation sequence. In some implementations, the proximity of the client device is determined based on at least two of a group consisting of an audio signal, an optical signal, a BT signal, a WiFi signal, and a GPS signal.

Further, in some implementations, the casting device 108 in the smart media display environment 100 may additionally or alternatively include one or more other occupancy sensors (e.g., touch screens, IR sensors, ambient light sensors and motion detectors). The casting device 108 could include radio-frequency identification (RFID) readers that determine occupancy based on RFID tags located in the client device 104.

Figure 3:
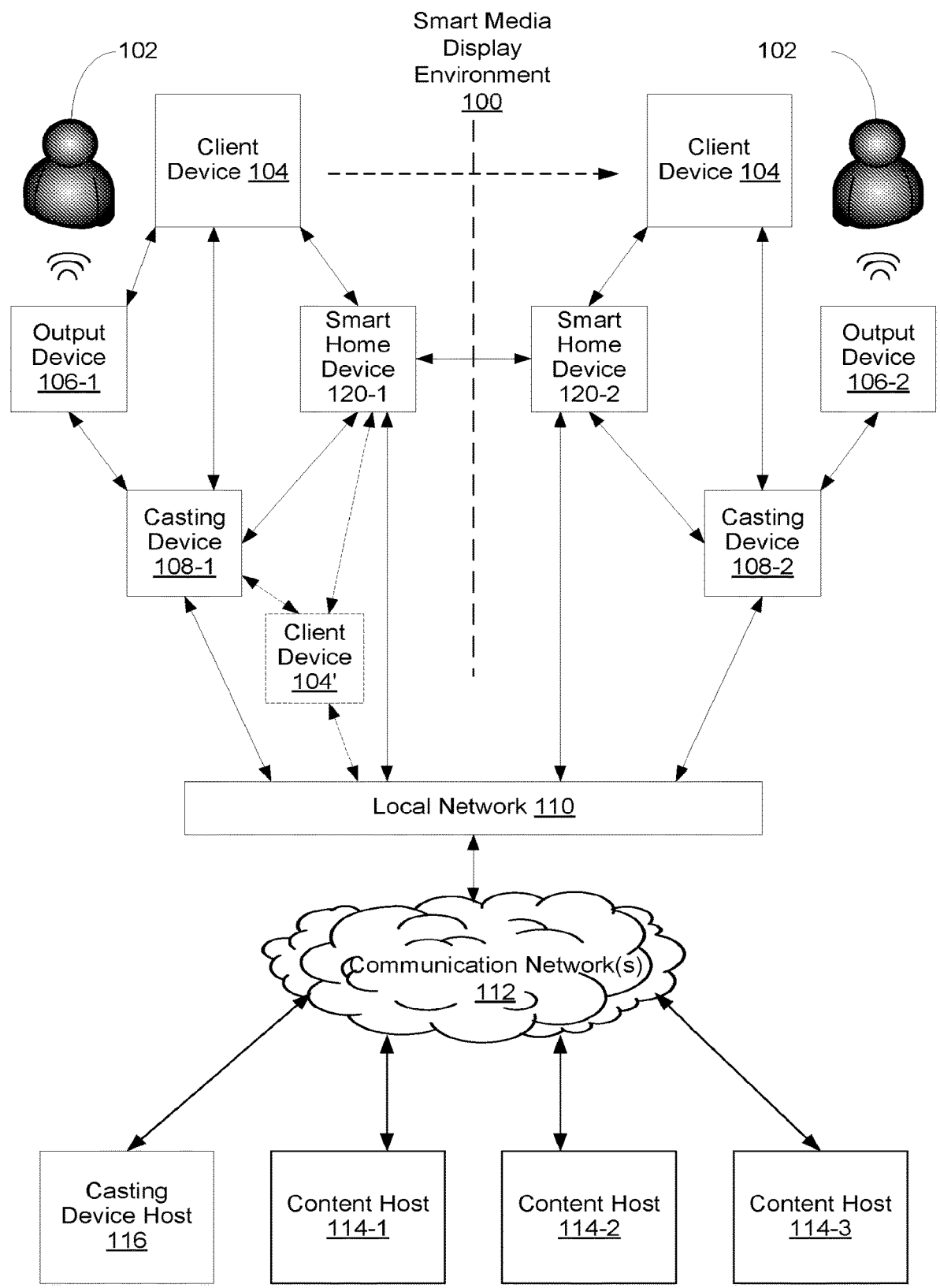
FIG. 3 is another example operating environment in which casting devices interact with a client device, smart home devices or a server system of the smart media display environment in accordance with some implementations.

FIG. 3 is another example operating environment in which casting devices 108 interact with a client device 104, smart home devices 120 or a server system 140 of the smart media display environment 100 in accordance with some implementations. The smart media display environment 100 includes one or more locations, location A and location B, and a user 102 is located at location A or B, and could move freely between these two locations. A casting device 108, an output device 106 and one or more smart home devices 120 are disposed at each of the one or more locations in the display environment 100, and communicated to each other via wired or wireless communication available therein. At each location, the respective casting device 108 is configured to obtain media content or Internet content for display on the output device 106 coupled to the casting device 108. Further, at each of the one or more locations in the display environment 100, at least one of the one or more smart home devices 120 is disposed at a known spot with respect to the casting device 108. The at least one of the smart home devices 120 is configured to detect a proximity of the user 102 or a client device 104 carried by the user 102, and provide information of the detected proximity to the casting device 108 located at the same location. The casting device 108 is configured to control display of the media content displayed on the output devices 106 according to the information of the detected proximity provided by the at least one of the smart home devices 120.

As explained above with reference to FIG. 1, the smart home devices 120 in the smart media display environment 100 may include, but are not limited to, smart thermostats 122, smart hazard detectors 124, smart doorbells 126, smart door locks 128, smart alarm systems 130, camera systems 132, microphone devices 134, smart wall switches 136, and smart appliances 138. The smart home devices 120 are configured to detect a presence, proximity and/or location of a user or a client device 104 carried by a user. In some implementations, a network device (e.g., a router) could also function as a smart home device 120 for detecting the proximity of the client device 104.

The smart home device 120 could determine the proximity of the client device 104 using an audio sensor or an optical sensor (e.g., a built-in IR sensor). For example, a microphone device 124 can be regarded as a smart home device in this application, and used to determine occupancy of a location in a smart media display environment 100. Specifically, audio captured by the microphone device 124 may be processed to identify the presence and the proximity of the user 102 in a particular room. Moreover, a camera 132 can also be regarded as a smart home device. The camera 132 captures an image or a video clip at a specific location, and the image or the video clip is processed to identify the presence and proximity of a user 102 in the location (e.g., a kitchen). Alternatively, the cameras 132 may additionally include one or more embedded sensors (e.g., IR sensors and motion detectors) to detect a presence, proximity or location of a user 102.

The smart home device 120 could also determine the proximity of the client device 104 based on one or more of a BT signal, a WiFi signal, and a GPS signal associated with the client device 104. Further, in some implementations, the smart home device 120 in the smart media display environment 100 may additionally or alternatively include one or more other occupancy sensors (e.g., touch screens, IR sensors, ambient light sensors and motion detectors). The smart home device 120 could include radio-frequency identification (RFID) readers that determine occupancy based on RFID tags located in the client device 104.

When a smart home device 120 is disposed at a known spot with respect to a casting device 108, the smart home device 120 or the client device 108 is configured to detect a proximity between the smart home device 120 and the client device 108, and the casting device 108 obtains from the smart home device 120 or the client device 108 information concerning the proximity between the smart home device 120 and the client device 108. Such a proximity between the smart home device 120 and the client device 108 is associated with the proximity of the client device 104 to the casting device 108, because the smart home device 120 is disposed at a known spot with respect to the casting device 108.

Specifically, the smart home device 120 could determine its proximity of the client device 104 based on its own detection of the presence of the client device 104, and provide it to the casting device 108 disposed at the same location. Alternatively, the client device 104 could determine its proximity of the smart home device 120 based on its own detection of the presence of the smart home device 120, and provide it to the casting device 108 disposed at the same location. Further, in some implementations, the smart home device 102 and the client device 104 provide their respective location information to a server 140. The server is configured to determine an alternative proximity of the client device with respect to the smart home device 102 based on the location information of both the casting device 108-1 and the client device 104. The server 140 could then determine the proximity of the client device 104 to the casting device 104 based on the alternative proximity of the client device 104 and the known spot of the smart home device 102, and notify the casting device 108 of the proximity of the client device 104. Alternatively, the server could inform the casting device 118 of the alternative proximity of the client device 104, and the casting device 108 determines the proximity of the client device based on the alternative proximity of the client device 104 and the known spot of the smart home device 102. Optionally, the server 140 is a casting device host 116 that has authenticated the client device 104. Optionally, the server 140 is a specific content host 114 that provides the media content for display on the output device 106 and recognizes both the casting device 108 and the client device 104.

In some implementations, the smart home device 120 is disposed in close proximity to the casting device 108. The smart home device 120 detect a proximity of the user 102 or a client device 104 carried by the user 102. Such a proximity to the smart home device 120 could be approximately regarded as the proximity of the client device 104 to the casting device 108 that is located in proximity, and used directly by the casting device 108 to enable the automatic media output mode or the follow-me mode.

Figure 4:
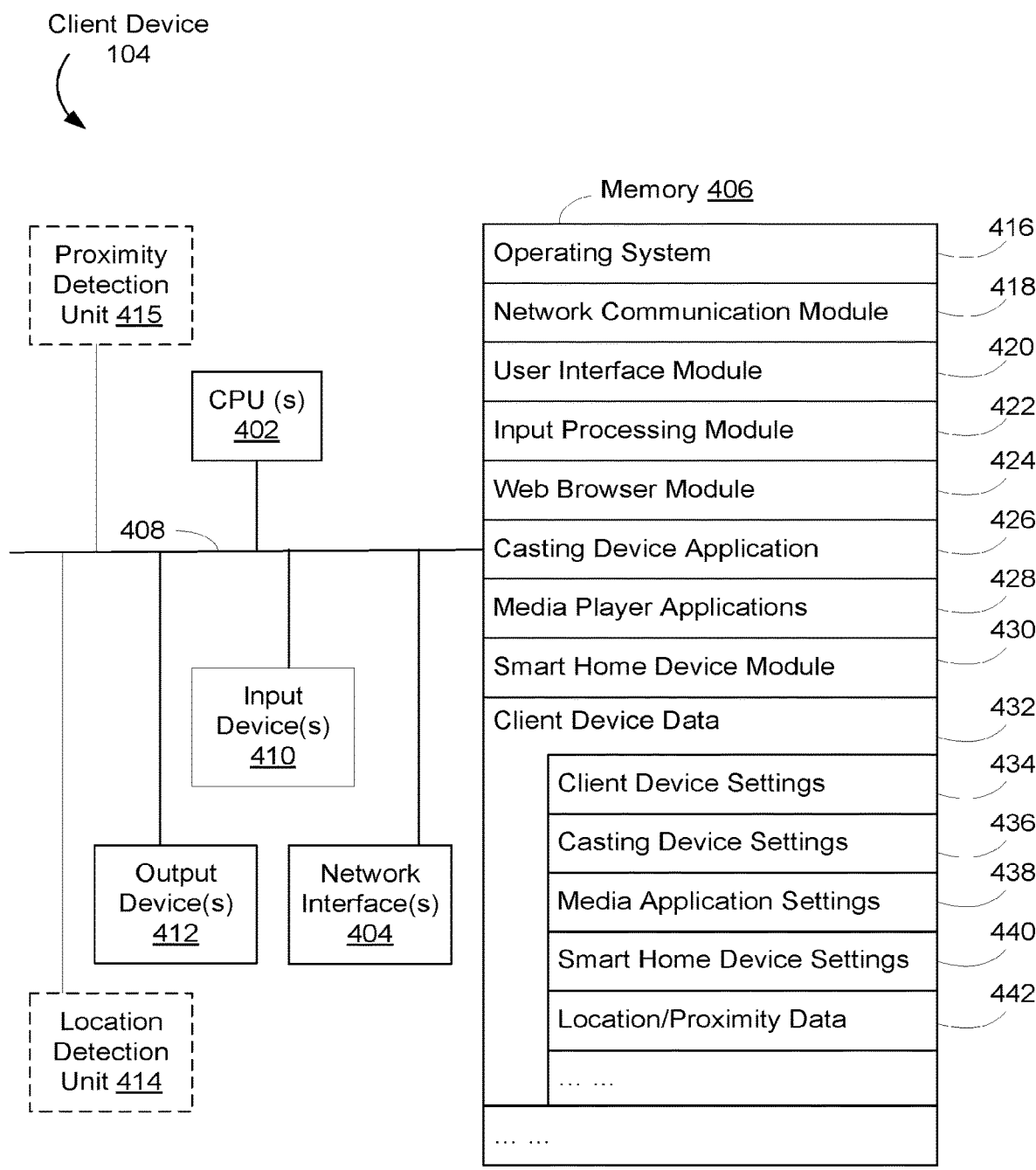
FIG. 4 is a block diagram illustrating an example client device that is applied for automatic control of display of media content in a smart media display environment in accordance with some implementations.

FIG. 4 is a block diagram illustrating an example client device 104 that is applied for automatic control of media display in a smart media display environment 100 in accordance with some implementations. Examples of the client device include, but are not limited to, a mobile phone, a tablet computer and a wearable personal device. The client device 104, typically, includes one or more processing units (CPUs) 402, one or more network interfaces 404, memory 406, and one or more communication buses 408 for interconnecting these components (sometimes called a chipset). The client device 104 includes one or more input devices 410 that facilitate user input, such as a keyboard, a mouse, a voice-command input unit or microphone, a touch screen display, a touch-sensitive input pad, a gesture capturing camera, or other input buttons or controls. Furthermore, some the client devices 104 use a microphone and voice recognition or a camera and gesture recognition to supplement or replace the keyboard. In some implementations, the client device 104 includes one or more cameras, scanners, or photo sensor units for capturing images, for example, of graphic series codes printed on the electronic devices. The client device 104 also includes one or more output devices 412 that enable presentation of user interfaces and display content, including one or more speakers and/or one or more visual displays. Optionally, the client device 104 includes a location detection device 414, such as a GPS (global positioning satellite) or other geo-location receiver, for determining the location of the client device 104. The client device 104 could also include a proximity detection device 415, e.g., an IR sensor, for determining a proximity of a casting device 108 or a smart home device 120.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- Operating system 416 including procedures for handling various basic system services and for performing hardware dependent tasks;
- Network communication module 418 for connecting the client device 104 to other devices (e.g., the server system 140, the casting device 108, the smart home devices 120 and the other client devices 104) via one or more network interfaces 404 (wired or wireless) and one or more networks 112, such as the Internet, other wide area networks, local area networks, metropolitan area networks, and so on;
- User interface module 420 for enabling presentation of information (e.g., a graphical user interface for presenting application(s) 426-430, widgets, websites and web pages thereof, and/or games, audio and/or video content, text, etc.) at the client device 104 via one or more output devices 412 (e.g., displays, speakers, etc.) associated with user interface 410;
- Input processing module 422 for detecting one or more user inputs or interactions from one of the one or more input devices 410 and interpreting the detected input or interaction;
- Web browser module 424 for navigating, requesting (e.g., via HTTP), and displaying websites and web pages thereof, including a web interface for logging into a user account associated with a casting device 108, a media application or a smart home device 120, controlling the casting device 108 or the smart home device 120 if associated with the user account, and editing and reviewing settings and data that are associated with the user account;
- One or more applications for execution by the client device (e.g., games, social network applications, smart home applications, and/or other web or non-web based applications for controlling the casting devices 108 and/04 the smart home devices 120 and reviewing data captured by such devices), including one or more of:
  - a casting device application 426 that is executed to provide client-side functionalities for device provisioning, device control, and user account management associated with casting device(s) 108;
  - one or more media player applications 428 that is executed to provide client-side functionalities for media display and user account management associated with corresponding media sources; and
  - one or more smart home device applications 430 that is executed to provide client-side functionalities for device provisioning, device control, data processing and data review of corresponding smart home devices 120; and
- client data 432 storing at least data associated with automatic control of media display (e.g., in an automatic media output mode or a follow-up mode), including:

Client device settings 434 for storing information associated with the client device 104 itself, including common device settings (e.g., service tier, device model, storage capacity, processing capabilities, communication capabilities, etc.), and information for automatic media display control;

Casting device settings 436 for storing information associated with user accounts of the casting device application 426, including one or more of account access information, information for device settings (e.g., service tier, device model, storage capacity, processing capabilities, communication capabilities, etc.), and information for automatic media display control;

Media player application settings 438 for storing information associated with user accounts of one or more media player applications 428, including one or more of account access information, user preferences of media content types, review history data, and information for automatic media display control;

Smart home device settings 440 for storing information associated with user accounts of the smart home applications 430, including one or more of account access information, information for smart home device settings (e.g., service tier, device model, storage capacity, processing capabilities, communication capabilities, etc.); and Location/proximity data 442 including information associated with the presence, proximity or location of any of the client device 104, the smart home devices 120 and the casting device 108.

In some implementations, each of the casting device application 426, the media player applications 428 and the smart home device applications 430 causes display of a respective user interface on the output device 412 of the client device 104. The user interfaces of the applications 426-430 could display a notification indicating that change of a display mode (e.g., the change from the active mode to the inactive mode) is pending or that display of media content is following a user in the smart media display environment. The user interfaces of the applications 426-430 could also prompt the user to enable automatic control of media display (e.g., in an automatic media output mode or a follow-me mode), create a schedule for such control of media display, set a priority among a plurality of users or their client devices, and confirm or forgo a display mode change. More details on the aforementioned user interfaces are discussed above with reference to FIGS. 8-13.

In some implementations, information for automatic media display control stored in the client data 432 includes one of more of a first enable setting for an automatic media output mode, a second enable setting for a follow-me mode, a schedule of automatic media display control, and user priority information for automatic media display control. As explained above, information for automatic media display control could be stored in association with one or more of the client device settings 434, the casting device settings 436 and the media player application settings 438.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
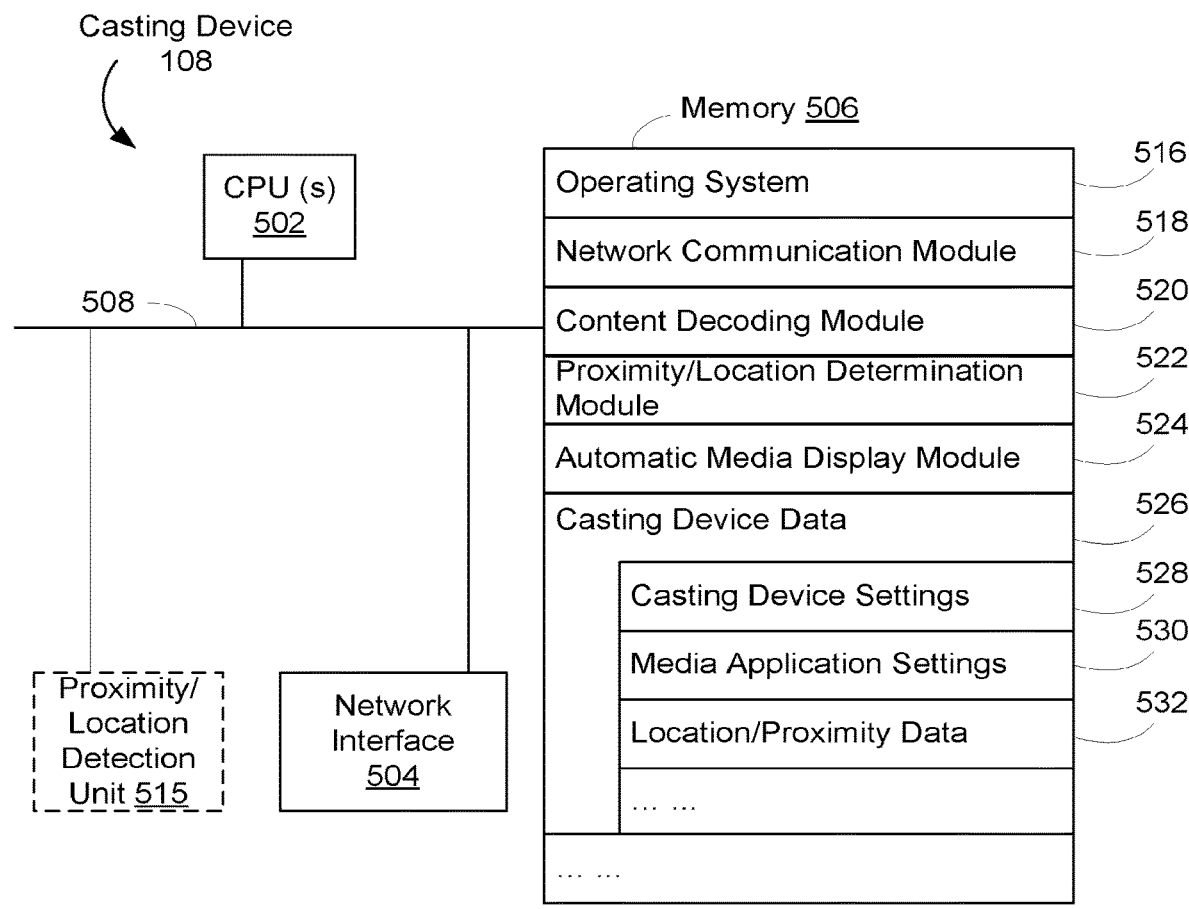
FIG. 5 is a block diagram illustrating an example casting device that is applied for automatic control of display of media content in a smart media display environment in accordance with some implementations.

FIG. 5 is a block diagram illustrating an example casting device 108 that is applied for automatic control of display of media content in a smart media display environment 100 in accordance with some implementations. The casting device 108, typically, includes one or more processing units (CPUs) 502, one or more network interfaces 504, memory 506, and one or more communication buses 508 for interconnecting these components (sometimes called a chipset). Optionally, the casting device 108 includes a proximity/location detection unit 515, such as an IR sensor, for determining the proximity of a user 102 or a client device 104 of the user 102.

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

Operating system 516 including procedures for handling various basic system services and for performing hardware dependent tasks;

Network communication module 518 for connecting the casting device 108 to other computers or systems (e.g., the server system 140, the smart home devices 120 and the client device 104) via one or more network interfaces 504 (wired or wireless) and one or more networks 112, such as the Internet, other wide area networks, local area networks, metropolitan area networks, cable television systems, satellite television systems, IPTV systems, and so on;

Content Decoding Module 520 for decoding content signals received from one or more content sources 114 and outputting the content in the decoded signals to an output display device 106 coupled to the casting device 108;

Proximity/location determination module 522 for determining the proximity of the client device 104 based on proximity related information that is detected by the proximity detection unit 515 or provided by the server system 140;

Automatic media display module 524 for controlling media display, e.g., causing automatic media output to the output device 106 and enabling the display of the output device 106 to follow a user 102 automatically;

casting device data 526 storing at least data associated with automatic control of media display (e.g., in an automatic media output mode and a follow-up mode), including:

Casting device settings 528 for storing information associated with user accounts of a casting device application, including one or more of account access information, information for device settings (e.g., service tier, device model, storage capacity, processing capabilities, communication capabilities, etc.), and information for automatic media display control;

Media player application settings 530 for storing information associated with user accounts of one or more media player applications, including one or more of account access information, user preferences of media content types, review history data, and information for automatic media display control; and Location/proximity data 532 including information associated with the presence, proximity or location of any of the client device 104, the smart home devices 120 and the casting device 436.

Information for automatic media display control could be stored in association with either the casting device settings 528 or the media player application settings 530. Information for automatic media display control includes one of more of a first enable setting for an automatic media output mode, a second enable setting for a follow-me mode, a schedule of automatic media display control, and user priority information for automatic media display control.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figure 6:
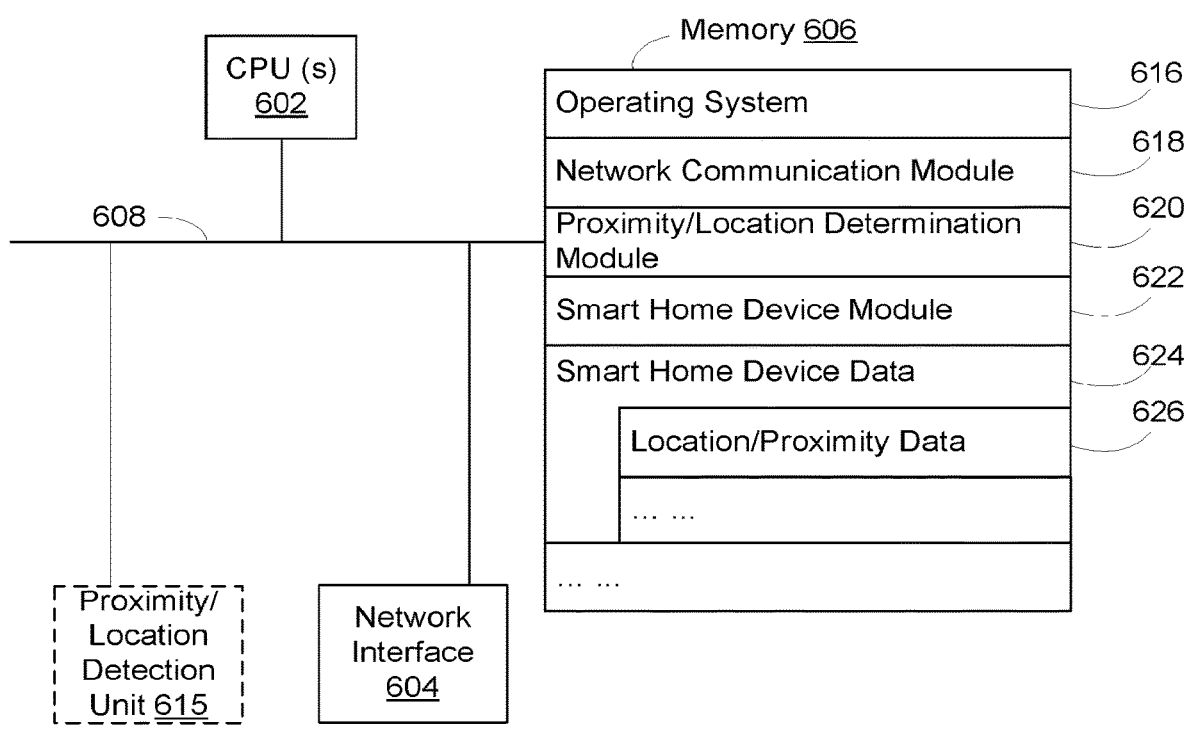
FIG. 6 is a block diagram illustrating an example smart home device in a smart media display environment in accordance with some implementations.

FIG. 6 is a block diagram illustrating an example smart home device 120 in a smart media display environment 100 in accordance with some implementations. The smart home device 120, typically, includes one or more processing units (CPUs) 602, one or more network interfaces 604, memory 606, and one or more communication buses 608 for interconnecting these components (sometimes called a chipset). Optionally, the smart home device 120 includes a proximity/location detection unit 615, such as an IR sensor, for determining a proximity of a user 102 or a client device 104 of the user 102. In some implementations, the smart home device 120 itself is capable of detecting the presence, location or proximity of a user 102 or a client device 104, and an example of such a smart home device 120 is a camera.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

Operating system 616 including procedures for handling various basic system services and for performing hardware dependent tasks for the smart home device 120;

Network communication module 618 for connecting the smart home device 120 to other computers or systems (e.g., the server system 140, the client device 104, the casting device 108 and other smart home devices 120) via one or more network interfaces 604 (wired or wireless) and one or more networks 112, such as the Internet, other wide area networks, local area networks, metropolitan area networks, and so on;

Proximity/location determination module 620 for determining a location of the smart home device 120 or an alternative proximity of the client device 104 with respect to the smart home device 120 that are detected by the proximity detection unit 615;

Smart home device module 622 for enabling the smart home device 120 to implement its designated functions (e.g., for capturing and generating multimedia data streams and sending the multimedia data stream to the client device 104 or the server system 140 as a continuous feed or in short bursts, when the smart home device 120 includes a video camera);

Smart home device data 624 storing at least data associated with automatic control of media display (e.g., in an automatic media output mode and a follow-up mode), including location/proximity data 626 associated with the presence, proximity or location of any of the client device 104, the smart home devices 120 and the casting device 436.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
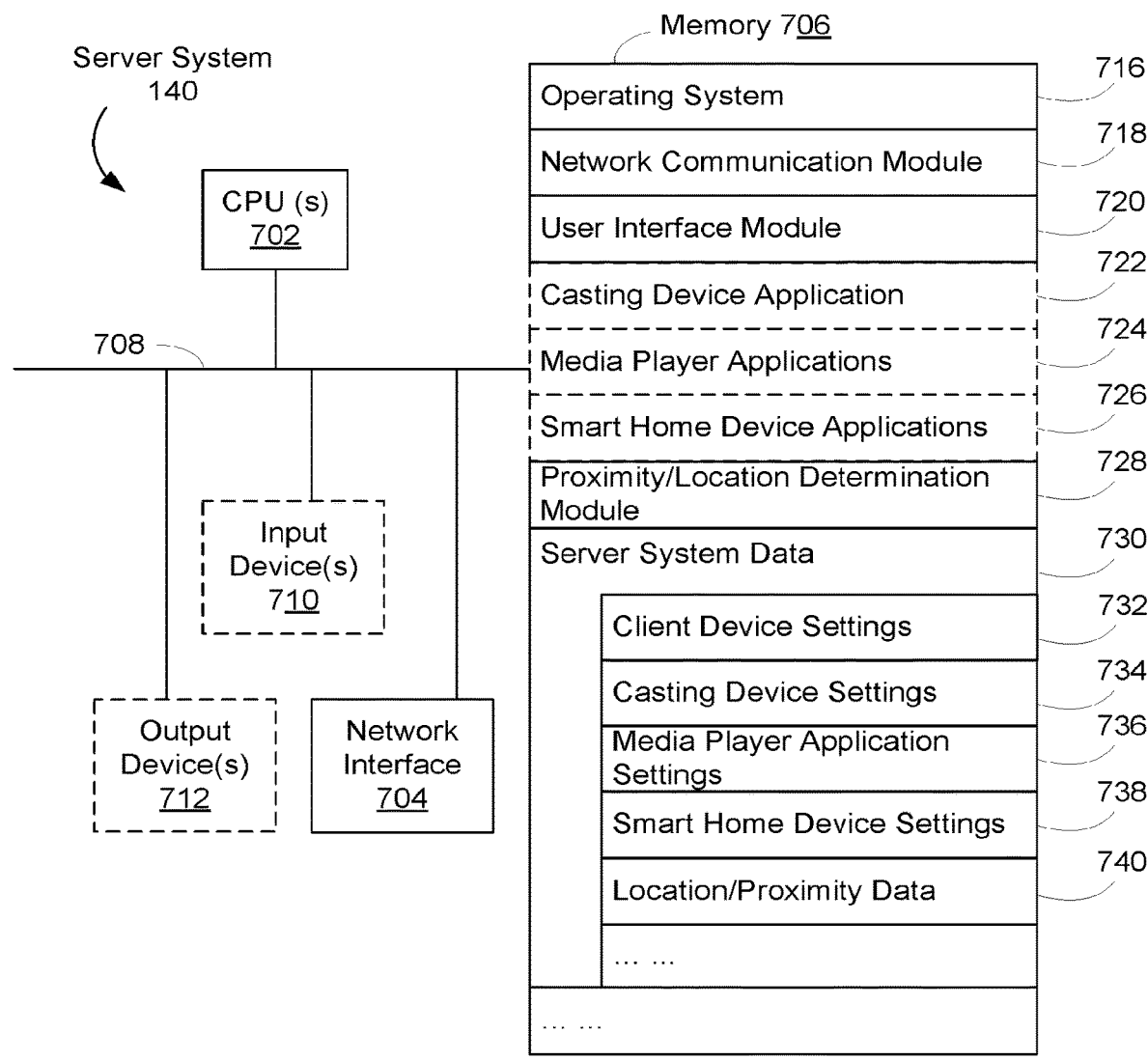
FIG. 7 is a block diagram illustrating an example server system of a smart media display environment in accordance with some implementations.

FIG. 7 is a block diagram illustrating an example server in the server system 140 of a smart media display environment 100 in accordance with some implementations. An example server is one of a content source host 114 and a casting device host 116. The server 140, typically, includes one or more processing units (CPUs) 702, one or more network interfaces 704, memory 706, and one or more communication buses 708 for interconnecting these components (sometimes called a chipset). The server 140 could include one or more input devices 710 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 712 that enable presentation of user interfaces and display content, including one or more speakers and/or one or more visual displays.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the server system 140 to other devices (e.g., various servers in the server system 140, the client device 104, the casting device 108, and the smart home devices 120) via one or more network interfaces 704 (wired or wireless) and one or more networks 112, such as the Internet, other wide area networks, local area networks, metropolitan area networks, and so on;

User interface module 720 for enabling presentation of information (e.g., a graphical user interface for presenting application(s) 426-430, widgets, websites and web pages thereof, and/or games, audio and/or video content, text, etc.) at the client device 104;

One or more applications for execution on the server side (e.g., games, social network applications, smart home applications, and/or other web or non-web based applications for controlling the client device 104, the casting devices 108 and the smart home devices 120 and reviewing data captured by such devices), including one or more of:

a casting device application 722 that is executed to provide server-side functionalities for device provisioning, device control, and user account management associated with casting device(s) 108;

one or more media player applications 724 that is executed to provide server-side functionalities for media display and user account management associated with corresponding media sources; and one or more smart home device applications 726 that is executed to provide server-side functionalities for device provisioning, device control, data processing and data review of corresponding smart home devices 120; and Proximity/location determination module 728 for determining the proximity of the client device 104 to either the casting device 108 or the smart home device 120 based on location information of any of the client device 104, the smart home device 120 and the casting device 108;

Server system data 730 storing at least data associated with automatic control of media display (e.g., in an automatic media output mode and a follow-up mode), including:

Client device settings 732 for storing information associated with the client device 104, including common device settings (e.g., service tier, device model, storage capacity, processing capabilities, communication capabilities, etc.), and information for automatic media display control;

Casting device settings 734 for storing information associated with user accounts of the casting device application 722, including one or more of account access information, information for device settings (e.g., service tier, device model, storage capacity, processing capabilities, communication capabilities, etc.), and information for automatic media display control;

Media player application settings 736 for storing information associated with user accounts of one or more media player applications 724, including one or more of account access information, user preferences of media content types, review history data, and information for automatic media display control;

Smart home device settings 738 for storing information associated with user accounts of the smart home applications 726, including one or more of account access information, information for one or more smart home devices 120 (e.g., service tier, device model, storage capacity, processing capabilities, communication capabilities, etc.); and Location/proximity data 740 including information associated with the presence, proximity or location of any of the client device 104, the smart home devices 120 and the casting device 108.

In some implementations, each of the casting device application 722, the media player applications 724 and the smart home device applications 726 causes display of a respective user interface on the output device 712 of the client device 104. It is further noted that the server system 140 is optionally a server type selected from a casting device host 116, a content host 114 and a smart home device host. In some implementations, according to its server type, the server system 140 executes one of the casting device application 722, the media player applications 724 and the smart home device applications 726 based on corresponding data settings selected from client device settings 732, casting device settings 734, and media player application settings 738.

Further, in some implementations, information for automatic media display control is optionally stored in the server system data 730 in association with one or more of the client device settings 732, the casting device settings 734 and the media player application settings 736. The stored information for automatic media display control includes, but is not limited to, one of more of a first enable setting for an automatic media output mode, a second enable setting for a follow-me mode, a schedule of automatic media display control, and user priority information for automatic media display control.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8B:
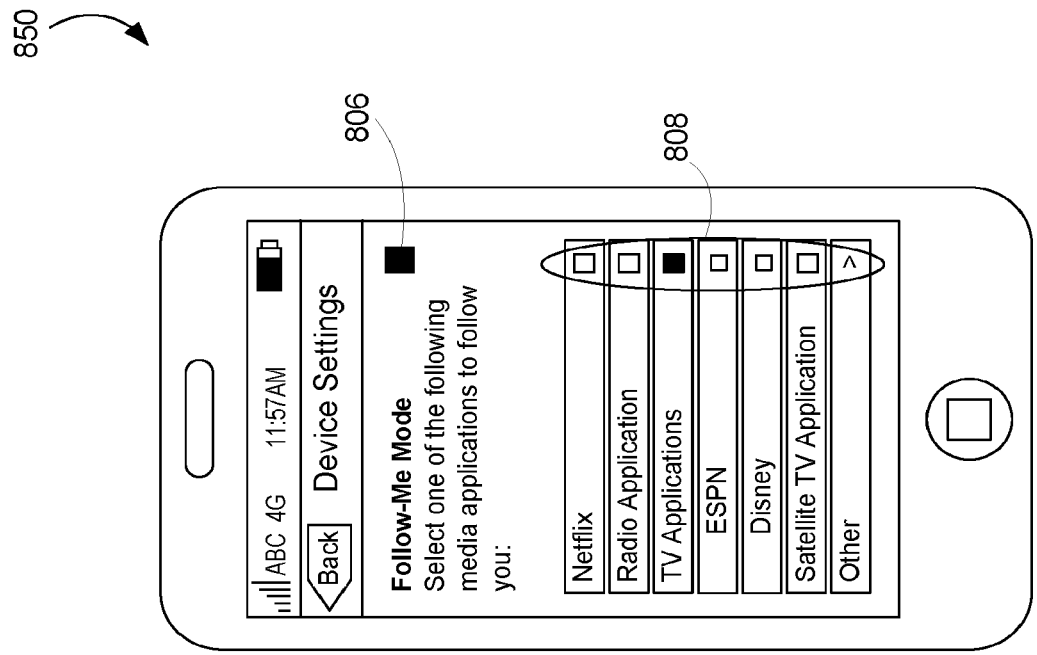
FIGS. 8A and 8B are two example user interfaces displayed on a display of a client device for controlling media display associated with media applications in accordance with some implementations.
Figure 8A:
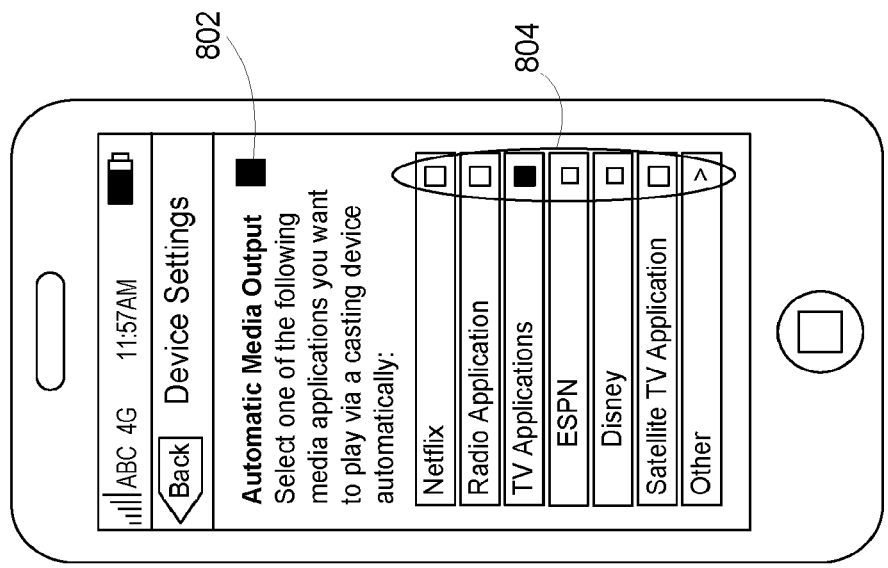

FIGS. 8A and 8B are two example user interfaces 800 and 850 displayed on a display of a client device 104 for controlling media display associated with media applications in accordance with some implementations. The user interface 800 is displayed on the display of the client device 104, and allows a user to determine the device settings of the client device 104 that define characteristics related to automatic media output for casting device(s) associated with the client device 104. The user interface 800 includes a first affordance 802 for enabling and disabling "Automatic Media Output," and a first plurality of media application affordances 804 each representing a media application available on the client device 104 for controlling display of media content provided by a corresponding media source. Examples of the media applications include, but are not limited to, an Internet-based media application (e.g., Netflix), a radio application, TV applications (e.g., ESPN and Disney), and a satellite TV application. Optionally, the user interface 800 could also be configured to display an instruction (e.g., "select one of the following media applications you want to play via a casting device automatically") to prompt a user 102 of the client device 104 to select one of the media applications for automatic media output.

In some implementations, the user 102 enables an automatic media output mode by selecting the first affordance 802. The user 102 could further associate the automatic media output mode with one or more media applications, when the user 102 selects one or more media applications in the list of media applications provided on the user interface 800. For example, automatic media output could be enabled for and limited to TV applications that display ESPN and Disney TV programs. Thus, in some implementations, when a casting device 108 associated with the client device 104 determines the proximity of the client device 104, the casting device 108 controls its output device 106 (if operating at an inactive state) to change from the inactive state to an active state, and receives and streams the ESPN or Display TV programs for display on the output device 106.

The user interface 850 is displayed on the display of the client device 104, and allows a user to determine the device settings of the client device 104 that define characteristics related to the follow-me mode for casting device(s) associated with the client device 104. The user interface 850 includes a third affordance 806 for enabling and disabling "Follow-Me Mode," and a second plurality of media application affordances 808 each representing a media application available on the client device 104 for controlling display of media content provided by a corresponding media source. The media applications associated with the second plurality of media application affordances 808 are optionally identical to or different from those associated with the first plurality of media application affordances 804. The user interface 800 could also display an instruction (e.g., "select one of the following media applications to follow you") to prompt a user 102 of the client device 104 to select one of the media applications for display of corresponding media content in the follow-me mode.

In some implementations, the user 102 enables the display of the media content in the follow-me mode by selecting the third affordance 806. The user 102 could further associate the follow-me mode with one or more media applications, when the user 102 selects one or more media applications in the list of media applications provided on the user interface 850. For example, the follow-me mode could be enabled for and limited to TV applications that display ESPN and Disney TV programs, i.e., only TV programs from ESPN and Disney follow the user 102 when the user 102 moves in the smart home environment 100 including two or more locations each disposed with a respective casting device 108 and a respective output device 106.

Figure 9:
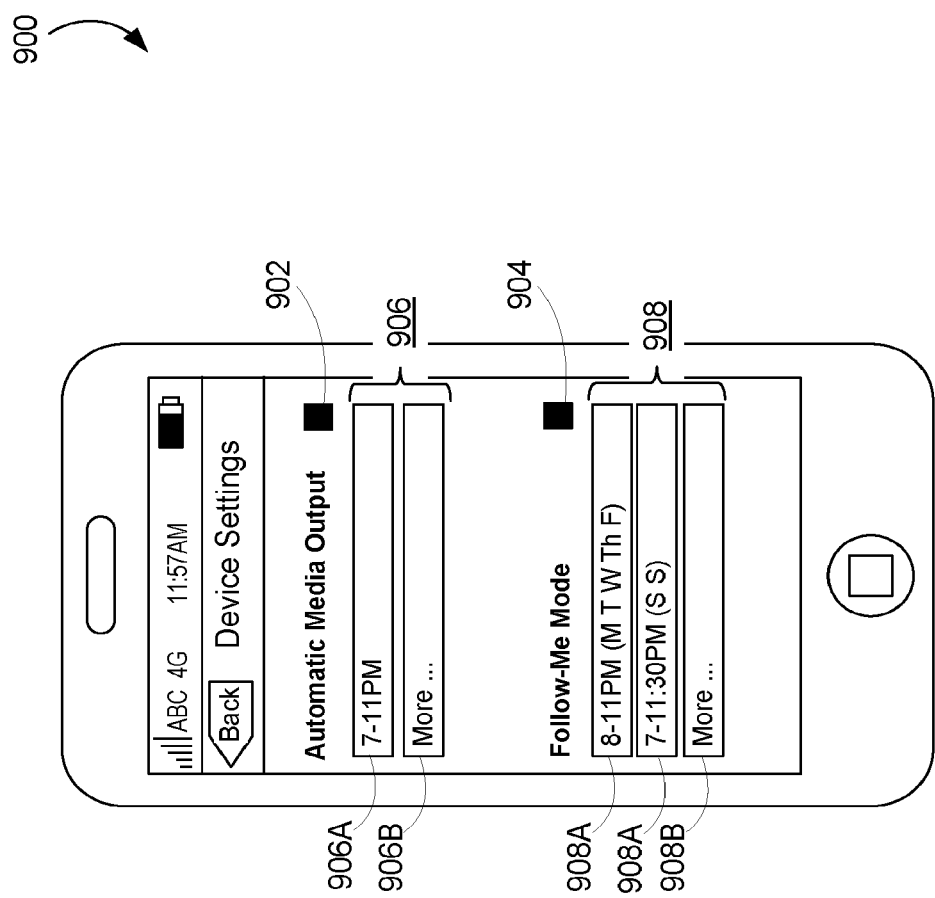
FIG. 9 is an example user interface displayed on a display of a client device for controlling a schedule for an automatic media output mode and a follow-me mode in accordance with some implementations.

FIG. 9 is an example user interface 900 displayed on a display of a client device 104 for controlling a schedule for both an automatic media output mode and a follow-me mode in accordance with some implementations. The user interface 900 allows a user 102 to determine device settings of the client device 104 that define the schedule related to the automatic media output mode and the follow-me mode for casting device(s) 108 associated with the client device 104. Specifically, the user interface 900 includes two affordances 902 and 904 for activating "Automatic Media Output" and "Follow-Me Mode," respectively. The user 102 could enable automatic media output to an output device 106 coupled to the client device 104 by selecting the affordance 902, or enable the display of the media content in the follow-me mode by selecting the affordance 904.

In addition, the user interface 900 includes a first list of selectable information items 906 and a second list of selectable information items 908 that are associated with the automatic media output mode and the follow-me mode, respectively. The first list of selectable information items 906 includes one or more schedule information items 906A and an addition information item 906B. The user 102 could select either the schedule information items 906A or the addition information item 906B. In response to a user selection of one of the schedule information items 906A, the selected schedule information item 906A becomes editable and allows the user 102 to modify a schedule for automatic media output associated with the selected schedule information item 906A. Further, in response to a user selection of the addition information item 906B, a pop-up window is displayed on top of the user interface 900, or the addition information item 906B is expanded within the user interface 900, such that the user 102 could enter a new schedule for automatic media output of casting device(s) associated with the client device 104.

Similarly, the second list of selectable information items 908 includes one or more schedule information item 908A and an addition information item 908B. The user 102 could select either the schedule information items 908A or the addition information item 908B. In response to a user selection of one of the schedule information items 908A, the selected schedule information item 908A becomes editable and allows the user 102 to modify a schedule for the follow-me mode associated with the selected schedule information item 908A. Further, in response to a user selection of the addition information item 908B, a pop-up window is displayed on top of the user interface 900, or the addition information item 908B is expanded within the user interface 900, such that the user 102 could enter a new schedule for enabling the follow-me mode of casting device(s) associated with the client device 104.

In the example shown in FIG. 9, the automatic media output mode is activated for casting device(s) associated with the client device 104 from 7 PM to 11 PM every evening, and the follow-me mode is activated casting device(s) associated with the client device 104 from 8 PM to 11 PM on the weekdays and from 7 PM to 11:30 PM during the weekend. Stated another way, the automatic media output mode and the follow-me mode are deactivated when the user is not at home or when the user is asleep at night. Thus, a casting device 108 detects the client device 104 and determines the proximity of the client device 104 only when the instant time satisfies the above schedules defined for the automatic media output mode and the follow-me mode. More details on how to set forth the schedule for device detection and proximity determination are discussed above with reference to FIG. 2.

Figures 10A, 10B:
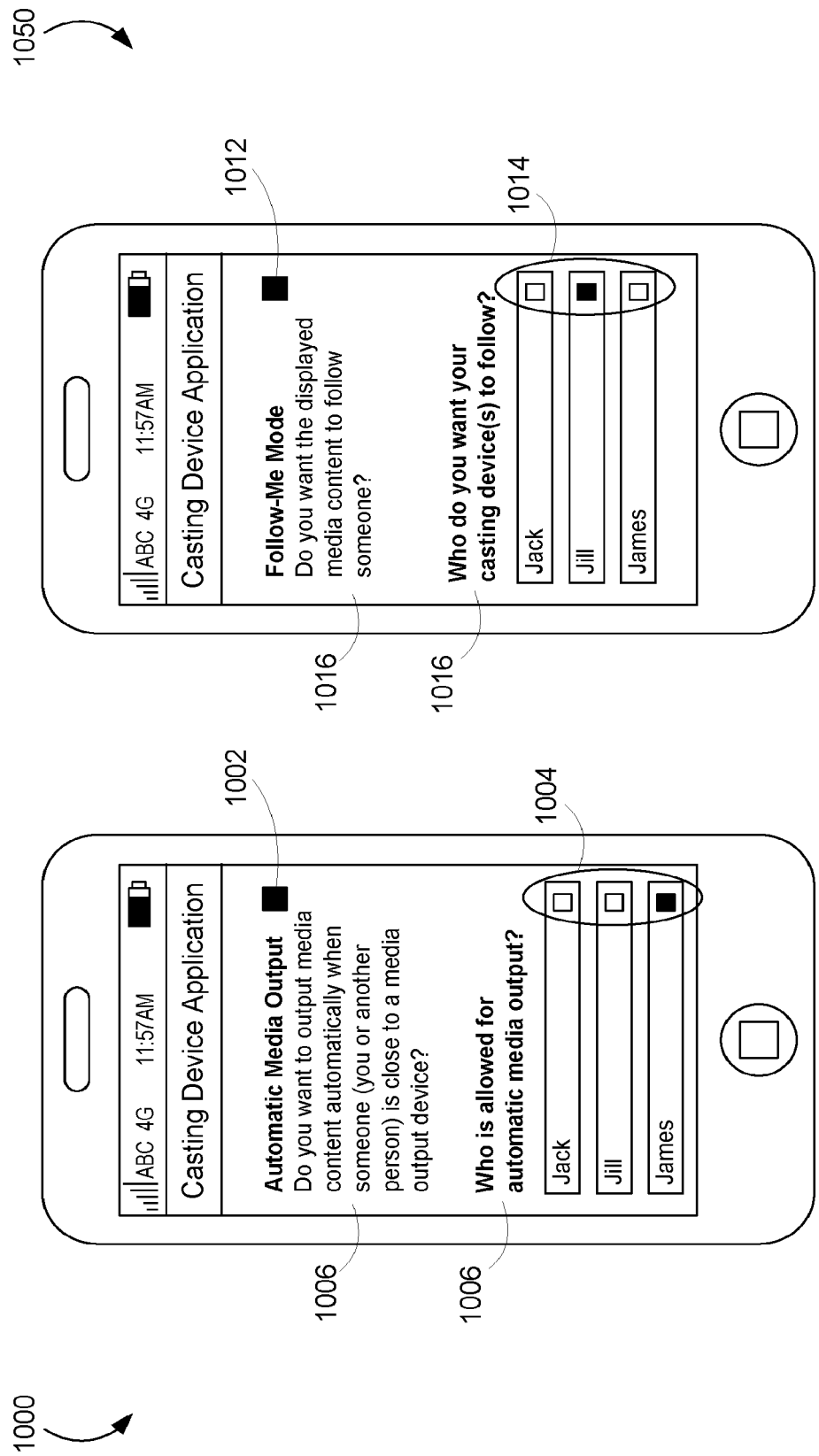
FIGS. 10A and 10B are two example user interfaces displayed on a display of a client device for controlling an automatic media output mode and a follow-me mode of a casting device in accordance with some implementations, respectively.

FIGS. 10A and 10B are two example user interfaces 1000 and 1050 displayed on a display of a client device 104 for controlling an automatic media output mode and a follow-me mode of a casting device 108 in accordance with some implementations, respectively. The user interface 1000 allows a user to determine settings of a casting device application for automatic media output associated with one or more casting devices 108 that have been connected to a user account of the casting device application. The user interface 1000 includes a first affordance 1002 for enabling and disabling "Automatic Media Output." Optionally, the user interface 1000 further includes a second plurality of user affordances 1004 each representing a user who is allowed to enable automatic media output. Optionally, the user interface 1000 could also be configured to display an instruction or inquiry 1006 (e.g., "Do you want to output media content automatically when someone (you or another person) is close to a media output device?" or "Who is allowed for automatic media output?") to prompt a user 102 of the client device 104 to enable automatic media output for one or more authorized users 102.

In some implementations, the user 102 enables an automatic media output mode by selecting the first affordance 1002. The user 102 could further associate the automatic media output mode with one or more authorized users 102, when the user 102 selects one or more users in the list of users displayed on the user interface 1000. For example, automatic media output could be enabled for and limited to a user named "James." Thus, in some implementations, when a casting device 108 associated with the casting device application determines a proximity of a client device 104 held by James, the casting device 108 controls its output device 106 (if operating at an inactive state) to change from the inactive state to an active state.

Further, the user interface 1050 is displayed on the display of the client device 104, and allows a user to determine settings of a casting device application for the follow-me mode associated with one or more casting devices 108 that have been connected to a user account of the casting device application. The user interface 1050 includes a third affordance 1012 for enabling and disabling the "Follow-Me Mode." Optionally, the user interface 1050 further includes a fourth plurality of user affordances 1004 each representing a user and the client device 104 associated with the respective user that will be followed in the follow-me mode. Optionally, the user interface 1050 could also be configured to display an instruction or inquiry 1006 (e.g., "Do you want to the displayed media content to follow someone?" or "Who do you want your casting device(s) to follow?") to prompt a user 102 of the client device 104 to enable the follow-me mode for one or more authorized users 102.

In some implementations, the user 102 enables the follow-me mode by selecting the third affordance 1012. The user 102 could further associate the follow-me mode with one or more authorized users 102, when the user 102 selects one or more users in the list of users displayed on the user interface 1050. For example, the follow-me mode could be enabled for and limited to a user named "Jill." Thus, in some implementations, when a casting device 108 associated with the casting device application determines a proximity of a client device 104 held by Jill, the casting device 108 controls its output device 106 to continue to display media content that was previously displayed for Jill at another output device 106 located at a distinct location of the smart media display environment 100.

In some implementations not shown in FIGS. 10A and 10B, two or more users 102 are selected for the casting device(s) associated with the casting device application on the user interface 1000 or 1050. The user interface 1000 or 1050 could be configured to rank the selected two or more users (e.g., define that a first user 102 has a priority over a second user 102'). When the casting device 108 determines the proximity to more than one selected user, the casting device 108 further determines that a first client device 104 of the first user 102 has a priority over the a second client device 104' of the second user 102', before it controls its output device 106 to display the media content that has been watched by the first user at a distinct location.

FIG. 11 is another example user interface 1100 displayed on a display of a client device 104 for controlling an automatic media output mode and a follow-me mode of a media application in accordance with some implementations. The user interface 1100 allows a user to determine settings of a media application (e.g., Netflix, Amazon Instant, ESPN and Disney) for both an automatic media output mode and a follow-me mode associated with one or more casting devices 108 that have been coupled to the media application. Specifically, the user interface 1100 includes two affordances 1102 and 1104 for activating "Automatic Media Output" and "Follow-Me Mode," respectively. The user 102 could enable an automatic media output mode for a casting device 108 and its output device 106 by selecting the affordance 1102, or enable the display of the media content in the follow-me mode by selecting the affordance 1104. Optionally, the user interface 1100 could also display an instruction or inquiry 1006 (e.g., "Do you want to output media content automatically when you are close to a media output device?" or "Do you want the displayed media content to follow you?") to prompt a user 102 of the client device 104 to enable the automatic media output mode or the follow-me mode.

In some implementations, the user 102 enables an automatic media output mode by selecting the first affordance 1102. When a casting device 108 detects the client device 104 held by the user 102 and determines a proximity of the client device 104, the casting device 108 controls its output device 106 (if operating at an inactive state) to change from the inactive state to an active state, and display media content provided by a media source associated with the media application. Further, in some implementations, the user 102 enables the follow-me mode by selecting the second affordance 1104. Media content provided by a media source associated with the media application is initially streamed by a first casting device 108-1 for display on a first output device that is coupled to the first casting device 108-1. When the user 102 leaves the first casting device 108-1 and moves in proximity to a second casting device 108-2. The second casting device 108-2 detects the client device 104 and determines the proximity of the client device 104. The second casting device 108-2 operates under the follow-me mode, controlling a second output device 106-2 to continue the display of the media content that was displayed on the first output device 108-1.

FIG. 12 is an example user interface 1200 that displays media content on a display of a client device 104 in accordance with some implementations. The media content is configured to be provided by a media source associate with a media application. The user interface 1200 includes a display area 1202 and a plurality of control affordances 1204, e.g., a volume control affordance 1204A, a media play affordance 1204B, a pause affordance 1204C, a status bar affordance 1204D, an automatic media output affordance 1204E and a follow-me mode affordance 1204F. The affordances 1204A-1204D are applied to control the display of the media content associated with the media application (e.g., adjust the volume, start or pause the display, and select a start frame to review the display).

In some implementations, the media content is displayed on the display area 1202, and the user 102 enables the automatic media output mode by clicking on the affordance 1204E. In response to the click on the affordance 1204E, the client device 104 generates a request for automatic media display on an output device 106 based on a proximity of the client device 104. In accordance with the automatic media output mode, a casting device 108 could detect the client device 104 and determine the proximity of the client device 104. When the casting device 108 determines that the client device 104 is within a proximity threshold from the casting device 108, the casting device controls the output device 106 coupled to the casting device 108 to change from an inactive state to an active state. The casting device 108 then streams the media content for display on the output device 106 coupled to the casting device, while the display area 1202 is either blank or displays the same media content. In some implementations, a first click on the affordance 1204E enables the automatic media output mode, and a second click on the affordance 1204E subsequent to the first click disables the automatic media output mode.

The user 102 could also enable the follow-me mode for the display of the media content associated with the media application by clicking on the affordance 1204F. In response to the click on the affordance 1204F, the client device 104 generates a request for displaying the media content in the follow-me mode. Casting devices 108 located at different locations of a smart media display environment 100 could detect the client device 104 and determine the proximity of the client device 104. Then, when the user 102 move among the different locations in the smart media display environment 100, the casting devices control the output devices 106 coupled to the casting devices 108, causing the display of the media content on the output devices 106 to track the location of the client device 104. In some implementations, a first click on the affordance 1204F enables the follow-me mode for the display of the media content associated with the media application, and a second click on the affordance 1204F subsequent to the first click disables the follow-me mode.

Figure 13B:
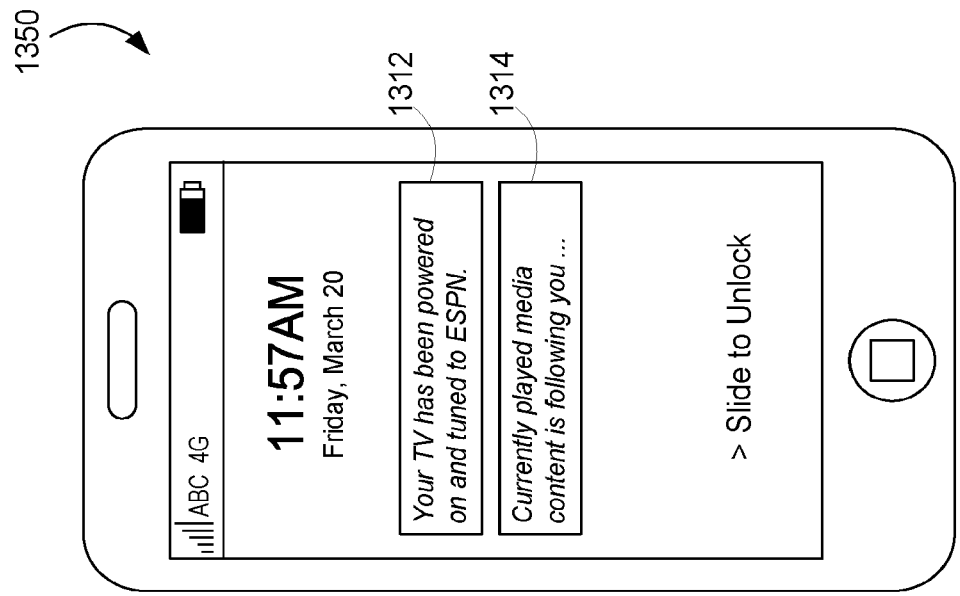
FIGS. 13A and 13B are two example user interfaces displayed on a display of a client device after a casting device detects a proximity of the client device in accordance with some implementations.
Figure 13A:
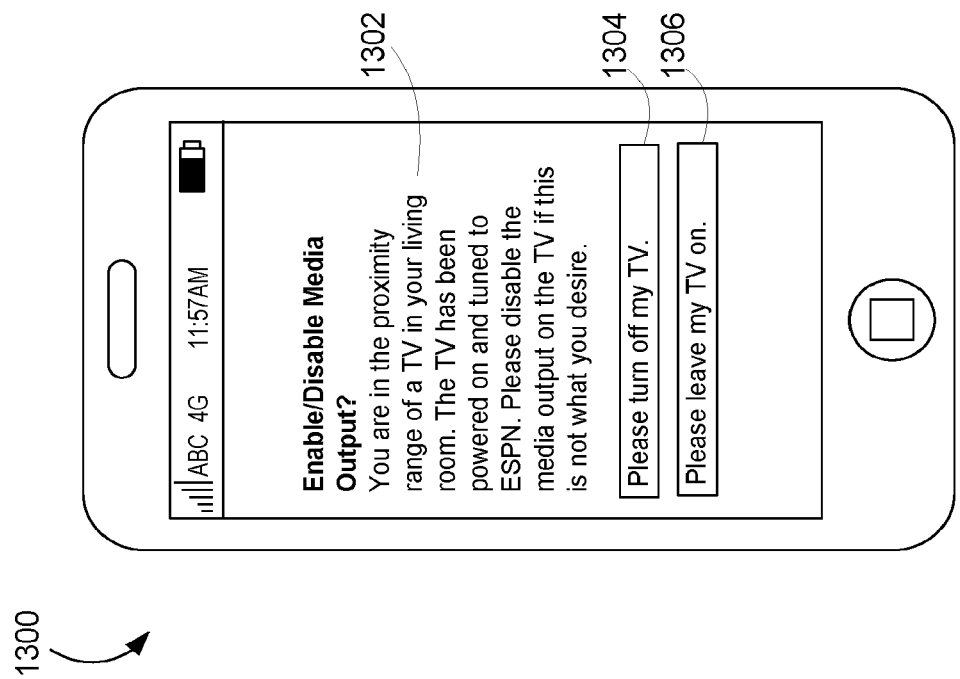

FIG. 13A is an example user interface 1300 displayed on a display of a client device 104 after a casting device 108 detects a proximity of the client device 104 in accordance with some implementations. The casting device 108 has been enabled for an automatic media output mode. After enabling the change of the output device 106 from the inactive state to the active state, the casting device 104 transmits a prompt to the client device 104. The prompt informs the user 102 of the change to the active state at the output device 106, and provides the user 102 with an option to cancel the change to the active state. For example, a message 1302 is displayed on the display of the client device 104, and reads "You are in the proximity range of a TV in your living room. The TV has been powered on and tuned to ESPN. Please disable the media output on the TV if this is not what you desire." The user interface 1300 further includes a first affordance 1304 and a second affordance 1306. In response to a respective user click on the first or second affordance, the casting device 108 aborts or finalizes the change of the inactive state to the active state, respectively. It is also noted that the prompt could also be enabled on the user interface 1300 before the output device 106 implements the change from the inactive state to the active state. More details of the prompt displayed on the client device 104 are discussed above with reference to FIG. 2.

FIG. 13B is another example user interface 1350 displayed on a display of a client device 104 after a casting device 108 detects a proximity of the client device 104 in accordance with some implementations. The casting device 108 has been enabled for an automatic media output mode or a follow-me mode. After enabling the change of the output device 106 from the inactive state to the active state, the casting device 104 transmits a notification to the client device 104 displayed on a home screen of the client device 104. For example, a notification 1312 informs the user 102 of the change to the active state at the output device 106 and a TV channel to which the output device 106 is tuned (e.g., ESPN). Another notification 1314 informs the user that the displayed media content is currently following the user. If the user wants to change settings for the automatic media output mode or the follow-me mode, the user needs to unlock the client device 104, and change the settings in device settings of the client device 104 (FIGS. 8A, 8B and 9), a casting device application associated with the casting device 108 (FIGS. 10A and 10B), or a media application associated with the displayed media content (FIGS. 11 and 12).

Figure 14B:
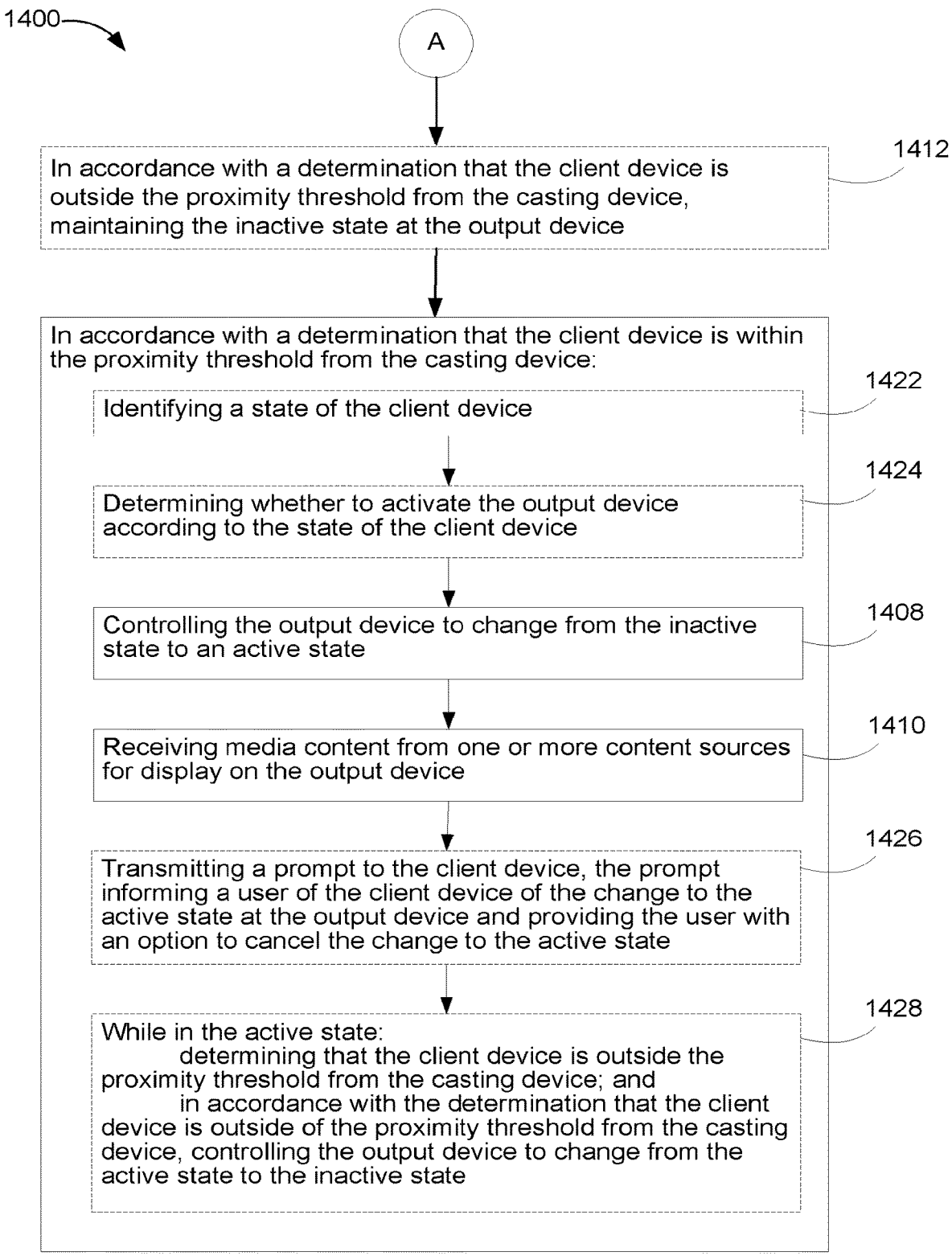

FIGS. 14A and 14B are flow diagrams illustrating a method 1400 of controlling display of media content for automatic media output based on user proximity or location in accordance with some implementations. The method 1400 is implemented at a casting device (e.g., the casting device 108 shown in FIG. 5) having one or more processors and memory storing instructions for execution by the one or more processors. The casting device is coupled to a display input of an output device (e.g., the output devices 106-1 and 106-2 shown in FIGS. 2 and 3). After determining (1402) that the output device operates at an inactive state, the casting device detects (1404) a client device (e.g., the client device 104 shown in FIG. 4) associated with the casting device, and determines (1406) a proximity of the client device, including determining whether the client device is within a proximity threshold from the casting device. In accordance with a determination that the client device is within the proximity threshold from the casting device, the casting device controls (1408) the output device to change from the inactive state to an active state, and receives (1410) media content from one or more content sources for display on the output device. Alternatively, in some implementations, in accordance with a determination that the client device is outside the proximity threshold from the casting device, the casting device maintains (1412) the inactive state at the output device. In some implementations, in accordance with the active mode, the output device is awake, fully powered on, and ready for use, and in accordance with the inactive mode, the output device operates at one of a power-off mode, a sleep mode and a hibernate mode.

In some implementations, when the output device operates at the inactive state, the casting device implements (1414) one of a group of operations consisting of powering off the output device, ceasing outputting media content to the output device, causing the output device to pause display of media content that is received by the output device, ceasing obtaining media content from any content source, causing the output device to reduce an output volume while continuing display of media content received by the output device, and muting a speaker of the output device.

In some implementations, a smart home device is disposed at a known spot with respect to the casting device, and one of the smart home device and the client device is configured to detect a proximity between the smart home device and the client device. The proximity of the client device is determined by the casting device by obtaining (1416) from one of a smart home device and the client device information concerning the proximity between the smart home device and the client device. The proximity between the smart home device and the client device is associated with the proximity of the client device to the casting device.

Further, in some implementations, the casting device provides (1418) location information of the casting device to a server (e.g., a server system 140), and obtains (1420) from the server information of the proximity of the client device. The server is configured to obtain location information of the client device and determine the information of the proximity of the client device from the location information of both the casting device and the client device.

In some implementations, the casting device identifies (1422) a state of the client device, and determines (1424) whether to activate the output device according to the state of the client device. For example, the casting device identifies that the client device is at a mute mode, determines that the user is present but not available, and maintains the inactive state at the output device. In some implementations, the casting device detects that the user is engaged in a telephone conversation, and that the user is present but not available. In accordance with a determination that the user is not available, the casting device deactivates the active state, maintains the inactive state and forgoes a change from the inactive state to the active state. Alternatively, the casting device monitors behavior of the user having the client device within a predetermined period of time, and determines the availability of the user according to the monitored behavior.

In some implementations, the casting device transmits (1426) a prompt to the client device. See FIG. 13A. The prompt informs a user of the client device of the change to the active state at the output device and provides the user with an option to cancel the change to the active state. Further, in some implementations, the client device executes an application for controlling the display of the content on the output device, and the application includes an affordance displayed to receive a user input to activate automatic media output. The application executed by the client device is one of a casting device application, a media player application, a TV program application, and a satellite broadcast application. In an example, the displayed affordance includes a toggle button.

In some implementations, while in the active state, the casting device determines (1428) that the client device is outside the proximity threshold from the casting device. In accordance with the determination that the client device is outside of the proximity threshold from the casting device, the casting device controls the output device to change from the active state to the inactive state.

In some implementations, the casting device detects the client device in accordance with a predefined schedule. For example, in accordance with the predefined schedule, proximity determination is prohibited at one or more predetermined times including a first time duration when the user is not at home, and a second time duration when the user is asleep.

The proximity of the client device could be determined based on an audio signal, an optical signal, a BT signal, a WiFi signal, a GPS signal or the like. A proximity/location determination module 522 of the casting device 108 is applied to determine the proximity of the client device. More details on proximity determination concerning the client device are discussed above with reference to at least FIGS. 1 and 2. Alternatively, in some implementations, the proximity of the client device is determined based on user intervention. For example, the first casting device includes a proximity button, and the proximity of a user carrying the client device is determined by the casting device when the user pushes the proximity button the casting device.

Figure 15:
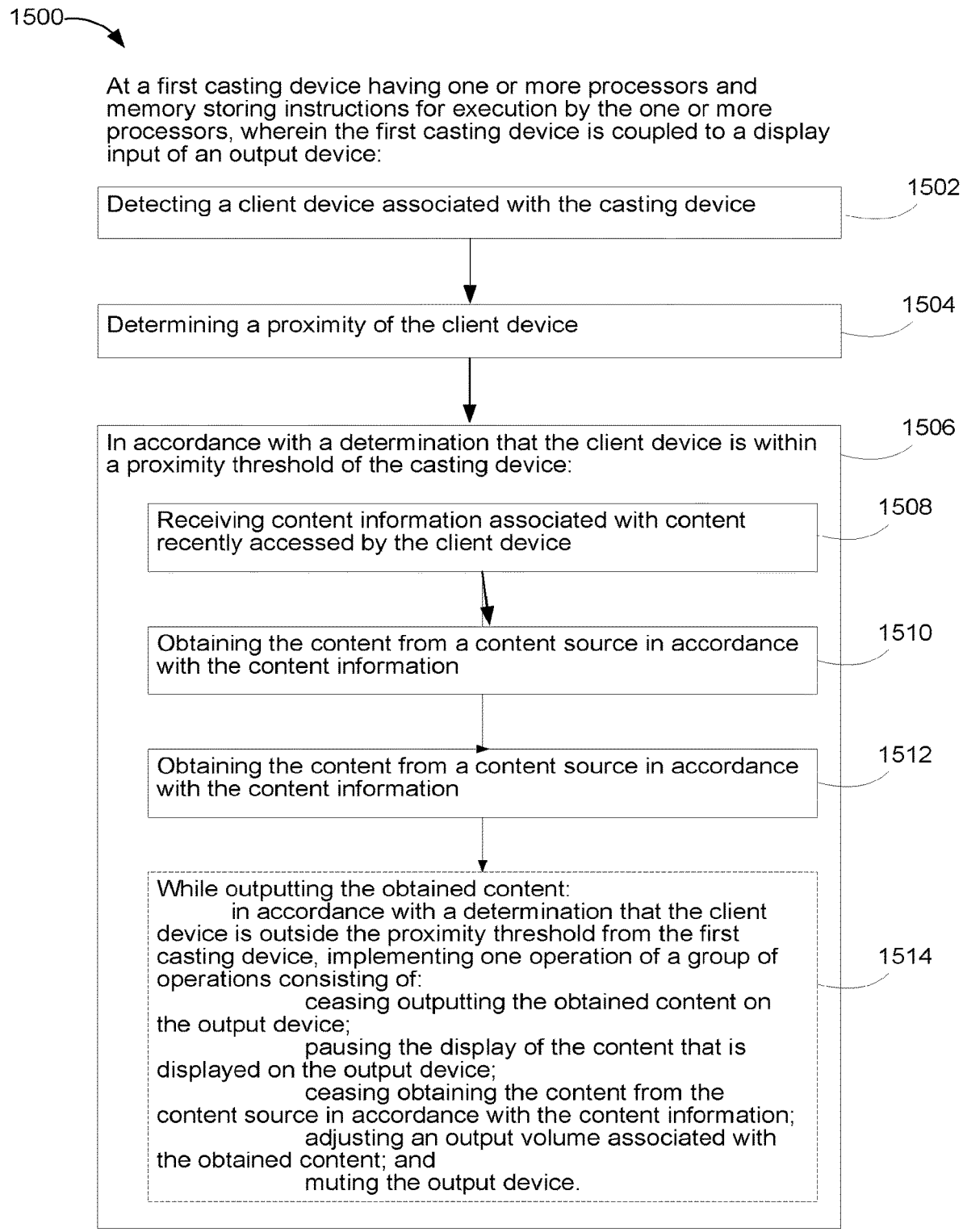
FIG. 15 is a flow diagram illustrating a method of controlling display of media content based on user proximity in accordance with some implementations.

FIG. 15 is a flow diagram illustrating a method 1500 of controlling display of media content based on user proximity in accordance with some implementations. The method 1500 is used to implement a follow-me mode at one or more casting devices including a first casting device (e.g., the casting device 108 shown in FIG. 5) having one or more processors and memory storing instructions for execution by the one or more processors. The first casting device is coupled to a display input of an output device (e.g., the output devices 106-1 and 106-2 shown in FIGS. 2 and 3). The first casting device detects (1502) a client device associated with the first casting device, and determines (1504) a proximity of the client device. In accordance with a determination (1506) that the client device is within a proximity threshold of the first casting device, the first casting device receives (1508) content information associated with content recently accessed by the client device, obtains (1510) the content from a content source (e.g., the content host 114 shown in FIGS. 1-3) in accordance with the content information, and outputs (1512) the obtained content to an output device in accordance with the content information. In some implementations, the proximity of the client device is determined at a proximity/location determination module 522 of the first casting device, and the output of the content is facilitated by an automatic media display module 524.

Further, in some implementations, while outputting the obtained content, in accordance with a determination that the client device is outside the proximity threshold from the first casting device, the casting device 108 implements (1514) one operation of a group of operations consisting of: powering off the output device, ceasing outputting the obtained content on the output device, causing the output device to pause the display of the content displayed thereon, ceasing obtaining the content from the content source in accordance with the content information, causing the output device to reduce an output volume associated with the obtained content, and muting a speaker of the output device.

In some implementations, the content information includes one or more of: output position, output quality, and output volume. The obtained content could be outputted at the output device from the output position, according to the output quality and/or at the output volume. In an example, the content information associated with the content displayed on the output device includes information indicating where the display of the content has been ceased at a last review. In another example, in accordance with a determination that the client device is outside the proximity threshold from the first casting device, the first casting device creates a token indicating at least where the content has been stopped at the time of the determination.

In some implementations, the first casting device is located at a first location of a smart media display environment. After the client device is outside the proximity threshold from the first casting device, a second casting device determines that the client device is within a proximity threshold from the second casting device and that the casting device is not associated with any other casting device. The second casting device receives the content information associated with the content, obtains the content from the content source in accordance with the content information, and outputs the obtained content to the second output device in accordance with the content information. Further, in some situations, the content information includes a token. In accordance with a determination that the client device is outside the proximity threshold from the first casting device, the first casting device updates the token indicating at least where the content has been stopped at the time of the determination. The updated token is received at the second casting device, and the obtained content is outputted to the second output device according to the token.

In some implementations, the casting device determines whether the first casting device is associated with any other client device. Optionally, the casting device determines that the first casting device is not associated with any other client device when it operates in the follow-me mode. In an example, the client device includes a first client device. The first casting device determines that a second client device is also within the proximity threshold from the casting device and associated with the first casting device, and that the first client device has a priority over the second client device.

In some implementations, the first casting device is associated with a user account of an application. The content information is stored in a memory of a remote server associated with the user account of the application, and the first casting device receives the content information from the remote server. Alternatively, in some implementations, the content information is stored in a local memory of the client device, and the first casting device receives the content information from the client device.

In some implementations, the client device executes an application for controlling the display of the content on the output device, and the application includes an affordance displayed to receive a user input to activate the follow-me mode. The application executed by the client device is one of a casting device application, a media player application, a TV program application, and a satellite broadcast application. In an example, the displayed affordance includes a toggle button.

The proximity of the client device could be determined based on an audio signal, an optical signal, a BT signal, a WiFi signal, a GPS signal or the like. More details on proximity determination concerning the client device are discussed above with reference to at least FIGS. 1 and 2. Alternatively, in some implementations, the proximity of the client device is determined based on user intervention. For example, the first casting device includes a proximity button, and the proximity of a user carrying the client device is determined by the casting device when the user pushes the proximity button the casting device.

Methods 1400 and 1500 are, optionally, governed by instructions that are stored in a non-transitory computer readable storage medium and that are executed by one or more processors of a casting device (e.g., the casting device 108). Each of the operations shown in FIGS. 14A, 14B and 15 may correspond to instructions stored in the computer memory or computer readable storage medium (e.g., memory 506 of the client device 108 in FIG. 5). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1400 or 1500 may be combined and/or the order of some operations may be changed.

It should be understood that the particular order in which the operations in FIGS. 14A and 14B or FIG. 15 have been described are merely exemplary and are not intended to indicate that the described order is the only order in which the operations could be performed. One of ordinary skill in the art would recognize various ways to cache and distribute specific data as described herein. Additionally, it should be noted that details of other processes described with respect to method 1400 (e.g., FIGS. 14A and 14B) are also applicable in an analogous manner to method 1500 described above with respect to FIG. 15, and that details of other processes described with respect to method 1500 (e.g., FIG. 15) are also applicable in an analogous manner to method 1400 described above with respect to FIGS. 14A and 14B. For brevity, these details are not repeated.

It will also be understood that, although the terms first, second, etc. are, in some instances, used herein to describe various elements, these elements should not be limited by these terms. These terms are only used to distinguish one element from another. For example, a first type of audio feature can be termed a second type of audio feature, and, similarly, a second type of audio feature can be termed a first type of audio feature, without departing from the scope of the various described implementations. The first type of audio feature and the second type of audio feature are both types of audio features, but they are not the same type of audio feature.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart media display environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A system for implementing a follow-me mode on casting devices, the system comprising:
   a first casting device that includes a hardware processor and an imaging device, wherein the hardware processor:
      receives, using the imaging device, imaging information corresponding to a smart media display environment that includes the first casting device and a plurality of casting devices;
      processes the imaging information to obtain proximity information associated with a user in the smart media display environment;
      determines, from the proximity information, that the user is within a proximity threshold of the first casting device;
      upon determining that the user is within the proximity threshold of the first casting device:
         receives content information associated with a media content item that was accessed by a second casting device from the plurality of casting devices in the smart media display environment;
         retrieves the media content item from a content source based on the received content information;
         determines that an output device connected to the first casting device is currently in an inactive mode in which the output device is inhibited from presenting media content and switches the output device from the inactive mode to an active mode in which the output device is capable of presenting media content; and
         causes the media content item to continue being presented on the output device connected to the first casting device in accordance with the received content information.

2. The system of claim 1, wherein the first casting device is coupled to a display input of the output device.

3. The system of claim 1, wherein the proximity information corresponds to a client device that is associated with the user in the smart media display environment and wherein the hardware processor further associates both the first casting device and the client device with a user account of an application, wherein the content information is stored in a memory of a remote server associated with the user account of the application, and the first casting device receives the content information from the remote server.

4. The system of claim 1, wherein the content information includes information indicating where display of the media content item has been stopped.

5. The system of claim 1, wherein the hardware processor further:
   determines that the user is no longer within the proximity threshold of the first casting device; and
   causes the media content item to stop being presented on the output device connected to the first casting device in response to determining that the user is no longer within the proximity threshold of the first casting device.

6. The system of claim 5, wherein the hardware processor further:
   generates a token indicating where the media content item stopped being presented on the output device connected to the first casting device based on the determination that the user is no longer within the proximity threshold of the first casting device; and
   transmits the token to a server device for updating the content information associated with the media content item.

7. The system of claim 5, wherein the hardware processor further, in response to determining that the user is no longer within the proximity threshold of the first casting device, causes the output device to be powered off.

8. The system of claim 5, wherein the hardware processor further, in response to determining that the user is no longer within the proximity threshold of the first casting device, inhibits the media content item from being retrieved from the content source.

9. The system of claim 5, wherein the hardware processor further, in response to determining that the user is no longer within the proximity threshold of the first casting device, causes the media content item to be paused from being presented on the output device connected to the first casting device.

10. The system of claim 5, wherein the hardware processor further, in response to determining that the user is no longer within the proximity threshold of the first casting device, causes an audio device associated with the output device to be muted.

11. The system of claim 5, wherein the hardware processor further, in response to determining that the user is no longer within the proximity threshold of the first casting device, causes the output device to reduce an output volume associated with the presentation of the media content item.

12. The system of claim 1, wherein the hardware processor further determines that the follow-me mode is associated with a subset of a plurality of users, wherein the subset of the plurality of users includes the user.

13. The system of claim 1, wherein the hardware processor further determines that the follow-me mode is associated with a subset of a plurality of media applications, wherein the subset of the plurality of media applications includes a first application configured to access the media content item accessed by the second casting device.

14. The system of claim 1, wherein the hardware processor further:
   determines a current time associated with the first casting device; and
   determines whether the determination that the user is within the proximity threshold of the first casting device should be performed based on the current time and based on a predetermined schedule.

15. The method of claim 1, wherein the proximity information indicates that a first user and a second user are within the proximity threshold of the first casting device and wherein the hardware processor further:
   determines that the first user has a priority over the second user; and
   retrieves the content information associated with a user account corresponding to the first user.

16. The system of claim 1, wherein the content information includes at least one of output position, output quality, and output volume.

17. The system of claim 1, wherein the smart media display environment includes a plurality of smart home devices and wherein the first casting device receives the proximity information from one of the plurality of smart home devices.

18. A method for implementing a follow-me mode on casting devices, the method comprising:
   receiving, using an imaging device of a first casting device, imaging information corresponding to a smart media display environment that includes the first casting device and a plurality of casting devices;
   processing, using a hardware processor of the first casting device, proximity information associated with a user in the smart media display environment;
   determining, using the hardware processor of the first casting device, from the proximity information, that the user is within a proximity threshold of the first casting device;
   upon determining that the user is within the proximity threshold of the first casting device:
      receiving, using the hardware processor of the first casting device, content information associated with a media content item that was accessed by a second casting device from the plurality of casting devices in the smart media display environment;
      retrieving, using the hardware processor of the first casting device, the media content item from a content source based on the received content information;
      determining, using the hardware processor of the first casting device, that an output device connected to the first casting device is currently in an inactive mode in which the output device is inhibited from presenting media content and switches the output device from the inactive mode to an active mode in which the output device is capable of presenting media content; and
      causing, using the hardware processor of the first casting device, the media content item to continue being presented on the output device connected to the first casting device in accordance with the received content information.

19. A non-transitory computer-readable medium containing computer executable instructions that, when executed by a processor, cause the processor to execute a method for implementing a follow-me mode on casting devices, the method comprising:
   receiving, using an imaging device of a first casting device, imaging information corresponding to a smart media display environment that includes the first casting device and a plurality of casting devices;
   processing proximity information associated with a user in the smart media display environment;
   determining, from the proximity information, that the user is within a proximity threshold of the first casting device;
   upon determining that the user is within the proximity threshold of the first casting device:
      receiving content information associated with a media content item that was accessed by a second casting device from the plurality of casting devices in the smart media display environment;
      retrieving the media content item from a content source based on the received content information;
      determining that an output device connected to the first casting device is currently in an inactive mode in which the output device is inhibited from presenting media content and switches the output device from the inactive mode to an active mode in which the output device is capable of presenting media content; and
      causing the media content item to continue being presented on the output device connected to the first casting device in accordance with the received content information.

* * * * *